Karl Macher
Inventor.

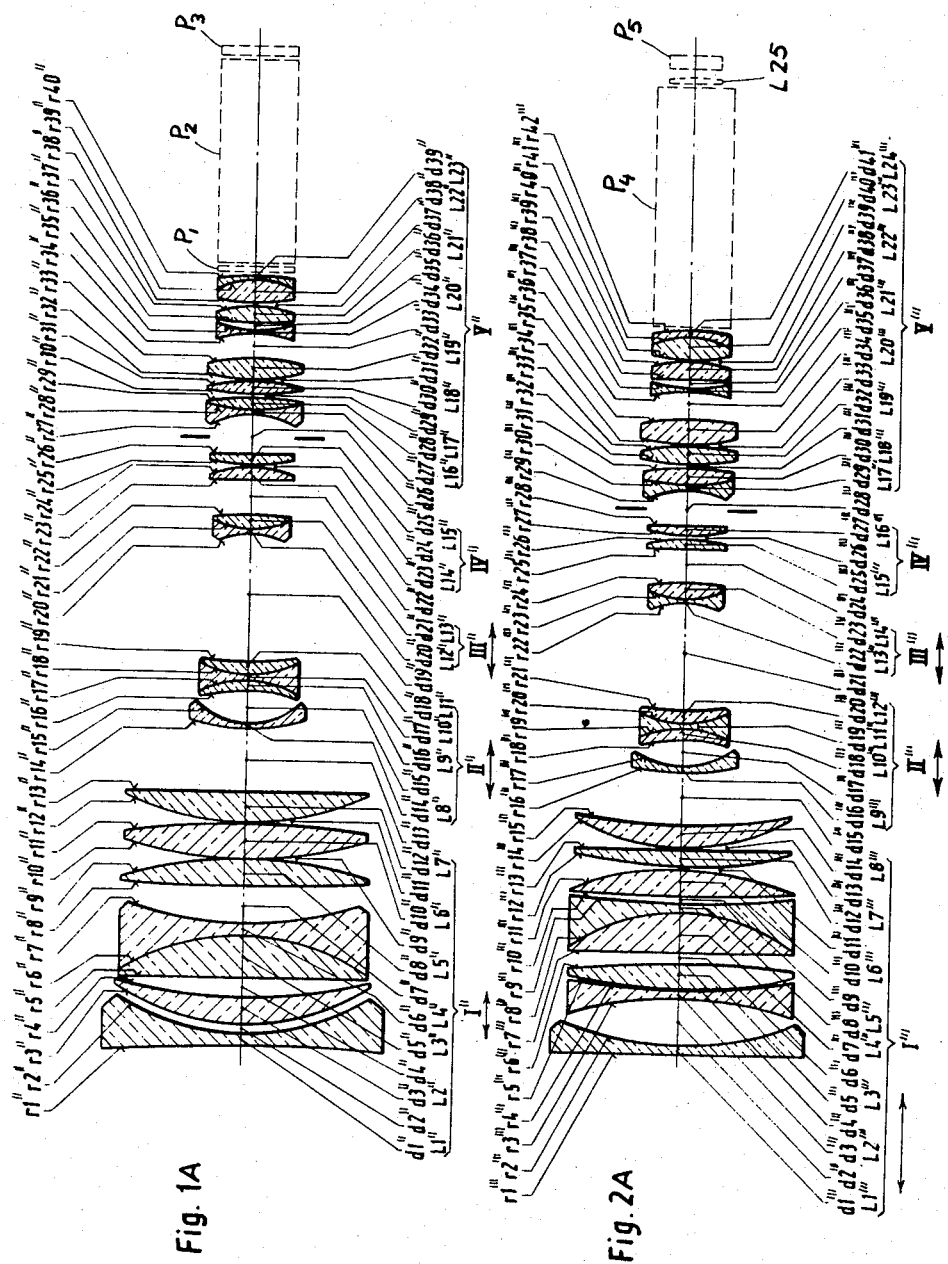

Dec. 22, 1970   K. MACHER   3,549,235
HIGH-SPEED VARIFOCAL OBJECTIVE SYSTEM
Filed July 1, 1968   3 Sheets-Sheet 3

INVENTOR:
Karl Macher
BY
Karl F. Ross
Attorney

United States Patent Office 3,549,235
Patented Dec. 22, 1970

3,549,235
HIGH-SPEED VARIFOCAL OBJECTIVE SYSTEM
Karl Macher, Bad Kreuznach, Germany, assignor to Jos. Schneider & Co. Optische Werke, Bad Kreuznach, Rhineland, Germany, a corporation of Germany
Filed July 1, 1968, Ser. No. 741,773
Claims priority, application Germany, June 30, 1967, 1,572,854, 1,572,855
Int. Cl. G02b 15/14
U.S. Cl. 350—184  13 Claims

ABSTRACT OF THE DISCLOSURE

Varifocal objective system with a relative aperture of about 1:2 and a varifocal ratio of about 10:1, including a basic multilens objective and a four-component front attachment with two movable negative components bracketed by two substantially fixed positive components; the first component, which may be limitedly shiftable (in whole or in part) for focusing purposes, includes one or two negative front lenses, a positive singlet, a negative doublet and three further positive singlets; the second component consists of a negative singlet followed by a negative triplet; the third component is a negative doublet; and the fourth component consists of two air-spaced positive singlets.

---

Figures 1, 2:
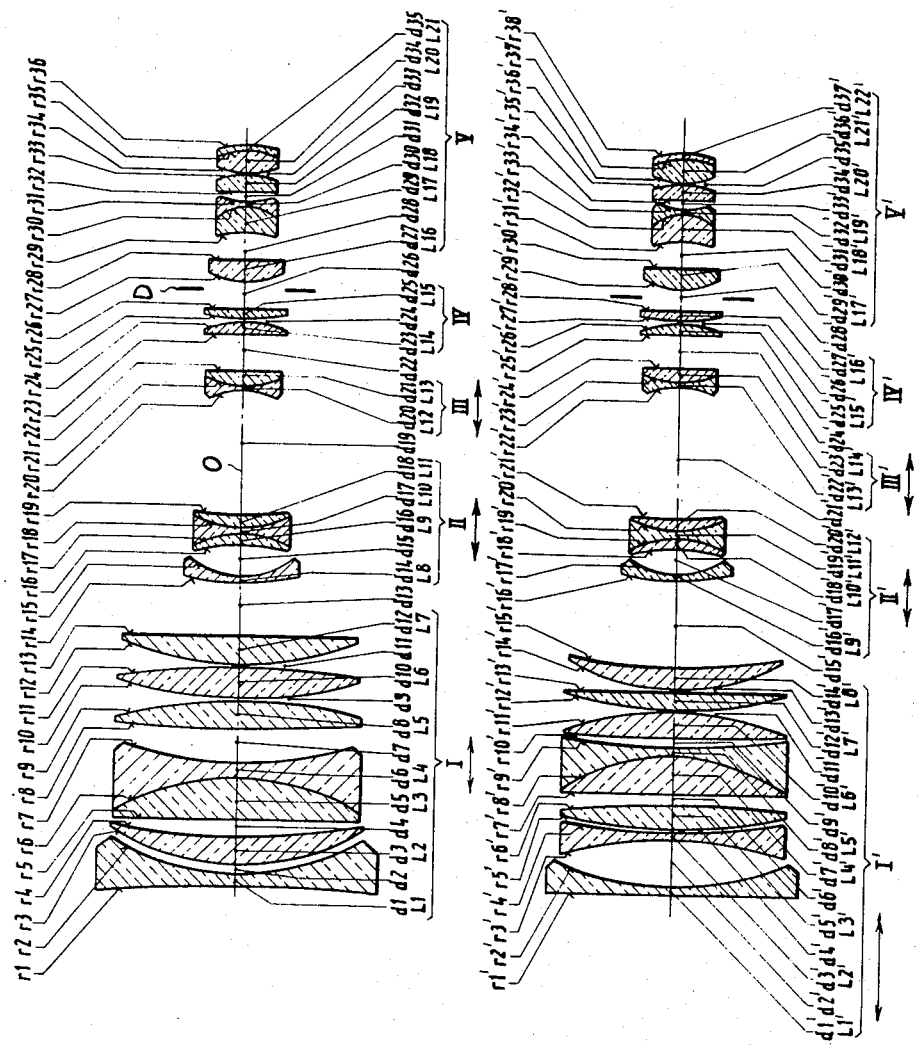

By present invention relates to a varifocal objective system of the general type disclosed in my prior U.S. Pat. No. 3,346,320 and in my copending application Ser. No. 488,957 filed Sept. 21, 1965.

This type of objective system includes a multilens basic objective of fixed focal length, preceded by a varifocal attachment which consists of a substantially fixed positive first component, an axially movable negative second component, an axially movable negative third component and a fixed positive fourth component; the term "substantially fixed," as applied to the first component, implies that the latter may be limitedly shiftable, in whole or in part, for focusing purposes as is well known per se.

As more specifically disclosed in my above-identified application and patent, the first component may include a dispersive front member followed by three air-spaced positive singlets while the second component consists of a negative singlet followed by a cemented negative lens member; the third component may be a doublet, whereas the fourth component has heretofore been designed as a single lens. With these previously disclosed systems I have been able to obtain varifocal ratios up to 8:1.

The principal objects of my present invention is to provide an objective system of this general character, to be used in photographic, motion-picture or television cameras, in which the varifocal ratio may be as high as or higher than 10:1 with a relative aperture on the order of 1:2.

Another object is to provide a system of this type whose back-focal length lies about midway within the varifocal range, approximating the individual focal length of the basic objective, whereby ancillary elements (e.g., prisms in the case of color-television cameras) may be conveniently accommodated between the last vertex and the image plane.

It is also an object of this invention to provide an objective system of the character referred to whose minimum focal length is shorter, preferably by at least 10%, than the image diagonal; with a back-focal length ranging between three and four times the minimum overall focal length of the system, this corresponds to an image angle on the order of 45°.

The aforestated objects are realized, in conformity with my present invention, by the provision of an objective system of the above-described type whose first component consists of one or two dispersive singlets followed by a collective singlet, a dispersive doublet and a group of three air-spaced positive singlets, the second component consisting of a negative singlet and a negative triplet; the third component is a single dispersive lens member, preferably a doublet consisting of a biconcave lens of relatively high Abbé number and a biconvex lens of relatively low Abbé number, while the fourth component is composed of two air-spaced collective singlets. As in my above-identified prior disclosures, the individual focal length of the fourth group exceeds (preferably by more than a third) that of the fourth component whereas the absolute value of the individual focal length of the third component exceeds (preferably by at least 10%) that of the second component.

The above and other features of my invention will be described in greater detail with reference to the accompanying drawing in which:

FIGS. 1 and 2 diagrammatically illustrate four representative embodiments;

FIGS. 1A and 2A illustrate modifications of the embodiments of FIGS. 1 and 2, respectively; and FIGS. 3–8 are graphs representing the changes in the positions of the movable components of the front attachment throughout the varifocal range for six specific numerical examples.

In FIG. 1 I have illustrated an optical system according to my invention which comprises a front attachment, consisting of four components I, II, III and IV, and a basic multilens objective V, the two lens groups being separated by a diaphragm D.

Component I, assumed to be limitedly shiftable along the objective axis O for focusing purposes, consists of seven lenses $L_1$ to $L_7$. Lens $L_1$ is a dispersive singlet with radii $r_1$, $r_2$ and thickness $d_1$; it is separated by an air space $d_2$ from lens $L_2$, a collective singlet with radii $r_3$, $r_4$ and thickness $d_3$ which in turn is followed after an air space $d_4$ by a dispersive doublet consisting of positive lens $L_3$ (radii $r_5$, $r_6$ and thickness $d_5$) and negative lens $L_4$ (radii $r_6$, $r_7$ and thickness $d_6$). Another air space $d_7$ separates this doublet from a group of three closely spaced positive singlets, i.e., lens $L_5$ with radii $r_8$, $r_9$ and thickness $d_8$, lens $L_6$ with radii $r_{10}$, $r_{11}$ and thickness $d_{10}$, and lens $L_7$ with radii $r_{12}$, $r_{13}$ and thickness $d_{12}$; the intervening air spaces have been designated $d_9$ and $d_{11}$.

Component II is of negative power and is axially shiftable, being separated by a variable air space $d_{13}$ from component I. It consists of a negative singlet (radii $r_{14}$, $r_{15}$ and thickness $d_{14}$) followed, after an air space $d_{15}$, by a negative triplet composed of a positive meniscus $L_9$ (radii $r_{16}$, $r_{17}$ and thickness $d_{16}$), a biconcave lens $L_{10}$ (radii $r_{17}$, $r_{18}$ and thickness $d_{17}$) and another positive meniscus $L_{11}$ (radii $r_{18}$, $r_{19}$ and thickness $d_{18}$).

A further variable air space $d_{19}$ separates component II from component III which is also of dispersive character and shiftable along the axis; it is a doublet consisting of a biconcave lens $L_{12}$ (radii $r_{20}$, $r_{21}$ and thickness $d_{20}$) cemented onto a positive lens $L_{13}$ (radii $r_{21}$, $r_{22}$ and thickness $d_{21}$).

The axially fixed fourth component IV, of positive refractivity, follows after another variable air space $d_{22}$ and consists of a pair of closely spaced positive lenses $L_{14}$ (radii $r_{23}$, $r_{24}$ and thickness $d_{23}$) and $L_{15}$ (radii $r_{25}$, $r_{26}$ and thickness $d_{25}$), their separation being designated $d_{24}$.

The diaphragm space separating the two groups has been indicated at $d_{26}$.

The basic objective V consists of a positive first lens $L_{16}$ (radii $r_{27}$, $r_{28}$ and thickness $d_{27}$) separated by air space $d_{28}$ from a negative doublet composed of a positive second lens $L_{17}$ (radii $r_{29}$, $r_{30}$ and thickness $d_{29}$) and a biconcave third lens $L_{18}$ (radii $r_{30}$, $r_{31}$ and thickness $d_{30}$), this doublet in turn being followed after an air space $d_{31}$ by a positive fourth lens $L_{19}$ (radii $r_{32}$, $r_{33}$ and thickness $d_{32}$) which is separated by an air space $d_{33}$ from a positive doublet composed of a biconvex fifth lens $L_{20}$ (radii $r_{34}$, $r_{35}$ and thickness $d_{34}$) and a sixth lens in the form of a negative meniscus $L_{21}$ (radii $r_{35}$, $r_{36}$ and thickness $d_{35}$).

In FIG. 2 I have shown a generally similar system which differs from that of FIG. 1 only by the interposition of another negative singlet, i.e., a biconcave len $L_{2'}$ between the negative front lens $L_{1'}$ and the first positive singlet $L_{3'}$ of component I'. This component, accordingly, consists of eight lenses $L_{1'}$ to $L_{8'}$, the remaining components II', III', IV', and V' being unaltered and consisting of lenses $L_{9'}$ to $L_{22'}$. The radii of curvature and the thickness and separations of the system of FIG. 2 have, accordingly, been designated $r_{1'}$ to $r_{38'}$ and $d_{1'}$ to $d_{37'}$.

Whereas the front component I in FIG 1 is axially displaceable as a unit for focusing purposes, only the first three lenses $L_{1'}$, $L_{2'}$ and $L_{3'}$ need to be so displaced in the system of FIG. 2.

FIG. 1A shows a modification of the system of FIG. 1 which differs only in the basic objective V'', the constituents I'', II'', III'' and IV'' of the varifocal attachment being structurally identical with the corresponding components of FIG. 1 and being identified by their radii $r_{1''}$ to $r_{26''}$ and their thicknesses and separations $d_{1''}$ to $d_{25''}$. Objective V'' is composed of a negative doublet consisting of a biconcave first lens $L_{16''}$ (radii $r_{27''}$, $r_{28''}$ and thickness $d_{27''}$) cemented onto a biconvex second lens $L_{17''}$ (radii $r_{28''}$, $r_{29''}$ and thickness $d_{28''}$), a positive third lens $L_{18''}$ (radii $r_{30''}$, $r_{31''}$ and thickness $d_{30''}$), a biconvex fourth lens $L_{19''}$ (radii $r_{32''}$, $r_{33''}$ and thickness $d_{32''}$), a biconcave fifth lens $L_{20''}$ (radii $r_{34''}$, $r_{35''}$ and thickness $d_{34''}$), a biconvex sixth lens $L_{21''}$ (radii $r_{36''}$, $r_{37''}$ and thickness $d_{36''}$), and a positive doublet consisting of a biconvex seventh lens $L_{22''}$ (radii $r_{38''}$, $r_{39''}$ and thickness $d_{38''}$) and a meniscus-shaped negative eighth lens $L_{23''}$ (radii $r_{39''}$, $r_{40''}$ and thickness $d_{39''}$), the intervening air spaces between these six lens members having been designated $d_{29''}$, $d_{31''}$, $d_{33''}$, $d_{35''}$ and $d_{37''}$.

In FIG. 2A I show a similar modification of the system of FIG. 2, the constituents I''', II''', III''' and IV''' of the front attachment being structurally identical with the corresponding components of FIG. 2 while the basic objective V''' consists of the same eight lenses as the objective V'' of FIG. 1A. The lenses $L_1'''$ to $L_{24}'''$ of this system have radii $r_1'''$ to $r_{42}'''$ and thicknesses and separations $d_1'''$ to $d_{41}'''$.

The substitution of the eight-lens basic objective V'' or V''' for the six-lens objective V or V' results in an increase of the back-focal length of the system which is particularly desirable if the space between the last vertex $r_{40''}$ or $r_{42'''}$) and the image plane is to accommodate additional equipment such as prisms $P_1$, $P_2$, $P_3$ (FIG. 1A) or $P_4$, $P_5$ (FIG. 2A) to be used for illuminating the photocathode of a color-television camera. As indicated in FIG. 2A, a small unsymmetrical biconvex lens $L_{25}$ may be interposed between the prisms $P_4$ and $P_5$.

The aforestated objects of large varifocal range, high aperture ratio, relatively large back-focal length and favorable relationship between minimum focal length and image diagonal are best achieved, pursuant to a more specific aspect of my invention, by adhering to the following design specifications for the radii of curvature of the various lenses as related to the individual focal lengths of the components of which they form part. In the varifocal attachment of FIGS. 1 and 1A, the radii $r_1$ to $r_{13}$ (or $r_{1''}$ to $r_{13''}$) of the six-member front component I (or I'') should be related to the individual focal length $f_I$ (or $f_{I''}$) by the inequalities listed below:

$$10f_I > -r_1 > 5f_I$$
$$2f_I > r_2 > 0.5f_I$$
$$2f_I > r_3 > 0.5f_I$$
$$5f_I > r_4 > f_I$$
$$|r_5| > 20f_I$$
$$1.5f_I > -r_6 > 0.8f_I$$
$$3f_I > r_7 > f_I$$
$$10f_I > r_8 > 5f_I$$
$$3f_I > -r_9 > f_I$$
$$3f_I > r_{10} > f_I$$
$$5f_I > -r_{11} > f_I$$
$$2f_I > r_{12} > 0.5f_I$$
$$|r_{13}| > 10f_I$$

The radii $r_{14}$ to $r_{19}$ (or $r_{14''}$ to $r_{19''}$) of the second component II (or II'') should be related to the individual focal length $f_{II}$ (or $f_{II''}$) by the following inequalities:

$$5|f_{II}| > r_{14} > 2|f_{II}|$$
$$2|f_{II}| > r_{15} > 0.5|f_{II}|$$
$$3|f_{II}| > -r_{16} > |f_{II}|$$
$$2|f_{II}| > -r_{17} > |f_{II}|$$
$$2|f_{II}| > r_{18} > |f_{II}|$$
$$5|f_{II}| > r_{19} > 2|f_{II}|$$

As to the third component III (or III''), the following relationships apply to the radii $r_{20}$ to $r_{22}$ (or $r_{20''}$ to $r_{22''}$) and the individual focal length $f_{III}$ (or $f_{III''}$) thereof:

$$|f_{III}| > -r_{20} > 0.4|f_{II}|$$
$$|f_{III}| > r_{21} > 0.5|f_{II}|$$
$$6|f_{III}| > r_{22} > |f_{II}|$$

For the fourth component IV (or IV'') with its radii $r_{23}$ to $r_{26}$ (or $r_{23''}$ to $r_{26''}$) and its individual focal length $f_{IV}$ (or $f_{IV''}$) the inequalities are:

$$10f_{IV} > |r_{23}| > 2f_{IV}$$
$$1.5f_{IV} > -r_{24} > 0.6f_{IV}$$
$$2f_{IV} > r_{25} > 0.7f_{IV}$$
$$|r_{26}| > 3f_{IV}$$

In the system of FIG. 2 or FIG. 2A, the radii $r_{1'}$ to $r_{15'}$ (or $r_{1'''}$ to $r_{15'''}$) of the seven-member front component I' (or I''') are related to the individual focal length $f_{I'}$ (or $f_{I'''}$) thereof as follows:

$$|r_{1'}| > 10f_{I'}$$
$$1.5f_{I'} > r_{2'} > 0.8f_{I'}$$
$$3f_{I'} > -r_{3'} > f_{I'}$$
$$4f_{I'} > r_{4'} > 2f_{I'}$$
$$3f_{I'} > r_{5'} > 1.5f_{I'}$$
$$7f_{I'} > -r_{6'} > 2f_{I'}$$
$$|r_{7'}| > 10f_{I'}$$
$$f_{I'} > -r_{8'} > 0.5f_{I'}$$
$$5f_{I'} > r_{9'} > 3f_{I'}$$
$$20f_{I'} > r_{10'} > 7f_{I'}$$
$$2f_{I'} > -r_{11'} > 0.8f_{I'}$$
$$3f_{I'} > r_{12'} > f_{I'}$$
$$100f_{I'} > -r_{13'} > 15f_{I'}$$
$$2f_{I'} > r_{14'} > 0.5f_{I'}$$
$$3f_{I'} > r_{15'} > f_{I'}$$

The relationship between the radii $r_{16'}$ to $r_{28'}$ (or $r_{16'''}$ to $r_{28'''}$) of components II', III' and IV' (or II''', III''', IV''') and their individual focal lengths $f_{II'}$, $f_{III'}$, $f_{IV'}$ (or $f_{II'''}$, $f_{III'''}$, $f_{IV'''}$) is the same as with the corresponding components of FIGS. 1 and 1A.

The radii $r_{27}$ to $r_{36}$ (or $r_{29'}$ to $r_{38'}$) of the four lens members of the basic objective V (or V') in FIG. 1 or 2 should bear the following relationships with the individual focal length $f_V$ (or $f_{V'}$) of this basic objective:

$$0.8f_V > r_{27} > 0.3f_V$$
$$|r_{28}| > 3f_V$$
$$1.2f_V > -r_{29} > 0.5f_V$$
$$0.5f_V > -r_{30} > 0.2f_V$$
$$0.7f_V > r_{31} > 0.3f_V$$
$$20f_V > r_{32} > f_V$$
$$f_V > r_{33} > 0.4f_V$$
$$0.8f_V > r_{34} > 0.4f_V$$
$$0.7f_V > r_{35} > 0.3f_V$$
$$2f_V > r_{36} > 0.8f_V$$

The modified basic objective V'' (or V''') of FIG. 1A or FIG. 1B should satisfy the conditions listed below as regards its individual focal length $f_{V''}$ (or $f_{V'''}$) and the radii $r_{27''}$ to $r_{40''}$ (or $r_{29'''}$ to $r_{42'''}$) of its six lens members:

$$0.6f_{V''} > -r_{27''} > 0.3f_{V''}$$
$$2f_{V''} > r_{28''} > f_{V''}$$
$$5f_{V''} > -r_{29''} > 1.5f_{V''}$$
$$3f_{V''} > r_{30''} 1.5f_{V''}$$
$$2f_{V''} > -r_{31''} > f_{V''}$$
$$2f_{V''} > r_{32''} > f_{V''}$$
$$2f_{V''} > -r_{33''} > f_{V''}$$
$$2f_{V''} > -r_{34''} > f_{V''}$$
$$f_{V''} > r_{35''} > 0.5f_{V''}$$
$$7f_{V''} > r_{36''} > 2f_{V''}$$
$$f_{V''} > -r_{37''} > 0.6f_{V''}$$
$$2f_{V''} > r_{38''} > f_{V''}$$
$$f_{V''} > -r_{39''} > 0.4f_{V''}$$
$$2.5f_{V''} > -r_{40''} > 1.5f_{V''}$$

The negative front lens of the first component is designed to increase the back-focal length of that group. The distribution of the refractive powers specified above has the purpose of shifting the entrance pupil throughout the varifocal range so far ahead that the diameters of the members of these components, especially of the front lens, may be relatively small. In addition, the relationships set forth afford good correction of all aberrations throughout the operative range.

I shall now list specific numerical values for the radii of curvature and the thicknesses and separations of representative embodiments of the two types of varifocal attachments (in their wide-angle position) and the two types of basic objectives illustrated in the drawing, these parameters being based on a numerical value of unity for the minimum focal length $f_{min}$ of the system; the tables listing these parameters also set forth the values of the corresponding refractive indices $n_d$ and the Abbé numbers $v$. It is to be understood that the tabulated values may vary within tolerances of ±20% for the radii as well as the thicknesses and separations, the tolerances for $n_d$ being ±0.20 and those for the Abbé numbers being ±5. In view of these tolerances, some of the decimals listed in the tables for the sake of completeness are considered insignificant both for the preferred systems and for the range of tolerances based thereon.

Table I, below releates to the system of FIG. 1. This system has a varifocal ratio of about 11:1, a back-focal length of 3.25 linear units ($f_{min}=1$) and a relative aperture of 1:2.0.

TABLE I

| Lenses | Radii | Thicknesses and separations | $n_d$ | $v_d$ | $v$ |
|---|---|---|---|---|---|
| I | $L_1$ $\{$ $r_1=-55.526$ | $d_1=0.378$ | 1.62041 | 60.3 | |
| | $r_2=+7.016$ | $d_2=0.270$ | Air space | | |
| | $L_2$ $\{$ $r_3=+7.076$ | $d_3=0.757$ | 1.62004 | 36.4 | |
| | $r_4=+17.709$ | $d_4=0.432$ | Air space | | |
| | $L_3$ $\{$ $r_5=+431.492$ | $d_5=1.243$ | 1.62041 | 60.3 | |
| | $L_4$ $\{$ $r_6=-7.016$ | $d_6=0.389$ | 1.72830 | 28.7 | |
| | $r_7=+11.585$ | $d_7=1.135$ | Air space | | |
| | $L_5$ $\{$ $r_8=+60.437$ | $d_8=0.811$ | 1.64050 | 60.1 | |
| | $r_9=-13.282$ | $d_9=0.010$ | Air space | | |
| | $L_6$ $\{$ $r_{10}=+12.898$ | $d_{10}=0.973$ | 1.64050 | 60.1 | |
| | $r_{11}=-23.137$ | $d_{11}=0.010$ | Air space | | |
| | $L_7$ $\{$ $r_{12}=+8.966$ | $d_{12}=0.811$ | 1.64050 | 60.1 | |
| | $r_{13}=\infty$ | $d_{13}=0.051$ | Air space [1] | | |
| II | $L_8$ $\{$ $r_{14}=+7.016$ | $d_{14}=0.195$ | 1.69100 | 54.7 | |
| | $r_{15}=+2.309$ | $d_{15}=0.643$ | Air space | | |
| | $L_9$ $\{$ $r_{16}=-5.871$ | $d_{16}=0.300$ | 1.80518 | 25.4 | |
| | $L_{10}$ $\{$ $r_{17}=-3.220$ | $d_{17}=0.195$ | 1.71300 | 53.8 | |
| | $L_{11}$ $\{$ $r_{18}=+3.220$ | $d_{18}=0.378$ | 1.80518 | 25.4 | |
| | $r_{19}=+8.552$ | $d_{19}=5.178$ | Air space [1] | | |
| III | $L_{12}$ $\{$ $r_{20}=-2.513$ | $d_{20}=0.162$ | 1.71300 | 53.8 | |
| | $r_{21}=+2.705$ | $d_{21}=0.420$ | 1.72151 | 29.3 | |
| | $L_{13}$ $\{$ $r_{22}=-19.812$ | $d_{22}=0.999$ | Air space [1] | | |
| IV | $L_{14}$ $\{$ $r_{23}=-33.759$ | $d_{23}=0.339$ | 1.62041 | 60.3 | |
| | $r_{24}=-3.746$ | $d_{24}=0.010$ | Air space | | |
| | $L_{15}$ $\{$ $r_{25}=+6.780$ | $d_{25}=0.291$ | 1.62041 | 60.3 | |
| | $r_{26}=+33.759$ | $d_{26}=0.054$ | Air space | | |
| V | $L_{16}$ $\{$ $r_{27}=+1.945$ | $d_{27}=0.699$ | 1.48606 | 81.5 | |
| | $r_{28}=+77.541$ | $d_{28}=0.632$ | Air space | | |
| | $L_{17}$ $\{$ $r_{29}=-2.830$ | $d_{29}=0.704$ | 1.80588 | 25.4 | |
| | $L_{18}$ $\{$ $r_{30}=-1.252$ | $d_{30}=0.153$ | 1.73627 | 32.2 | |
| | $r_{31}=+2.324$ | $d_{31}=0.249$ | Air space | | |
| | $L_{19}$ $\{$ $r_{32}=+10.726$ | $d_{32}=0.441$ | 1.48606 | 81.5 | |
| | $r_{33}=-2.293$ | $d_{33}=0.038$ | Air space | | |
| | $L_{20}$ $\{$ $r_{34}=+2.495$ | $d_{34}=0.546$ | 1.52122 | 62.3 | |
| | $L_{21}$ $\{$ $r_{35}=-2.873$ | $d_{35}=0.125$ | 1.78470 | 26.1 | |
| | $r_{36}=-8.512$ | | | | |

[1] Variable.

The individual focal lengths of the components I–V are as follows:

$$f_I = +7.1313$$
$$f_{II} = -2.4885$$
$$f_{III} = -4.1574$$
$$f_{IV} = +4.4873$$
$$f_V = +4.7237$$

Figure 3:
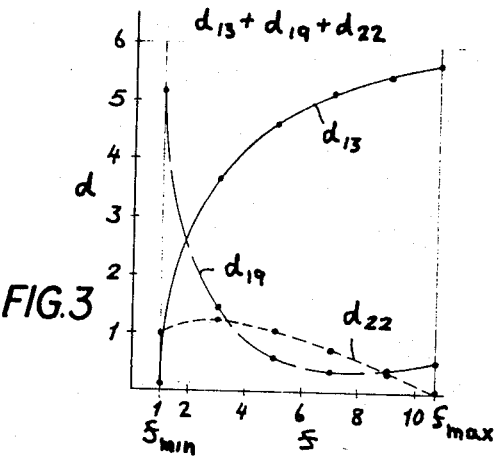

The air spaces $d_{113}$, $d_{19}$ and $d_{22}$, given in the table for the initial position $f=f_{min}$, vary in the manner illustrated in FIG. 3 as the overall focal length $f$ changes from its minimum value $f_{min}$ to its maximum value $f_{max}$. Particular magnitudes for these variable air spaces in six selected positions are listed below:

| $f$ | Variable air spaced | | |
|---|---|---|---|
| | $d_{13}$ | $d_{19}$ | $d_{22}$ |
| 1.0 | 0.051 | 5.178 | 0.999 |
| 3.0 | 3.538 | 1.462 | 1.228 |
| 5.0 | 4.604 | 0.577 | 1.046 |
| 7.0 | 5.152 | 0.352 | 0.723 |
| 9.0 | 5.477 | 0.392 | 0.358 |
| 10.75 | 5.663 | 0.527 | 0.037 |

This objective system may be designed, in practice, for the so-called Plumbikon a frame size of 12.85 x 17.12 mm., with $f_{min}=18$ mm. and $f_{max}=20$ mm.; the image diagonal is 21.4 mm., thus exceeding by more than 10% the minimum focal length.

Tables II, III and IV relates to the system of FIG. 2.

The system represented by Table II, which has the same image diagonal of 21.4 mm. when used with an actual value of $f_{min}=18$ mm. in connection with the aforementioned frame size, has a relative aperture of 1:2.1; its back-focal length (based on $f_{min}=1$) equals 3.71.

TABLE II

| Lenses | Radii | Thicknesses and separations | $n_d$ | $\nu$ |
|---|---|---|---|---|
| I' { L$_{1'}$ | $r_{1'}=+613.015$ | $d_{1'}=0.289$ | 1.62041 | 60.3 |
|  | $r_{2'}=+8.764$ | $d_{2'}=1.297$ | Air space | |
| L$_{2'}$ | $r_{3'}=-11.501$ | $d_{3'}=0.289$ | 1.62041 | 60.3 |
|  | $r_{4'}=+19.809$ | $d_{4'}=0.049$ | Air space | |
| L$_{3'}$ | $r_{5'}=+14.528$ | $d_{5'}=0.686$ | 1.66025 | 32.9 |
|  | $r_{6'}=-32.267$ | $d_{6'}=0.270$ | Air space | |
| L$_{4'}$ | $r_{7'}=+184.629$ | $d_{7'}=1.162$ | 1.71300 | 53.8 |
| L$_{5'}$ | $r_{8'}=-5.639$ | $d_{8'}=0.270$ | 1.72830 | 28.7 |
|  | $r_{9'}=+26.835$ | $d_{9'}=0.195$ | Air space | |
| L$_{6'}$ | $r_{10'}=+81.613$ | $d_{10'}=0.784$ | 1.64050 | 60.1 |
|  | $r_{11'}=-9.094$ | $d_{11'}=0.011$ | Air space | |
| L$_{7'}$ | $r_{12'}=+11.858$ | $d_{12'}=0.584$ | 1.64050 | 60.1 |
|  | $r_{13'}=-431.413$ | $d_{13'}=0.011$ | Air space | |
| L$_{8'}$ | $r_{14'}=+6.322$ | $d_{14'}=0.649$ | 1.64050 | 60.1 |
|  | $r_{15'}=+15.750$ | $d_{15'}=0.030$ | Air space [1] | |
| II' { L$_{9'}$ | $r_{16'}=+7.014$ | $d_{16'}=0.195$ | 1.69100 | 54.7 |
|  | $r_{17'}=+2.476$ | $d_{17'}=0.688$ | Air space | |
| L$_{10'}$ | $r_{18'}=-5.052$ | $d_{18'}=0.270$ | 1.80518 | 25.4 |
| L$_{11'}$ | $r_{19'}=-3.076$ | $d_{19'}=0.195$ | 1.71300 | 53.8 |
| L$_{12'}$ | $r_{20'}=+3.076$ | $d_{20'}=0.351$ | 1.80518 | 25.4 |
|  | $r_{21'}=+8.550$ | $d_{21'}=5.205$ | Air space [1] | |
| III' { L$_{13'}$ | $r_{22'}=-2.416$ | $d_{22'}=0.162$ | 1.71300 | 53.8 |
| L$_{14'}$ | $r_{23'}=+3.329$ | $d_{23'}=0.420$ | 1.72151 | 29.3 |
|  | $r_{24'}=-15.242$ | $d_{24'}=0.919$ | Air space [1] | |
| IV' { L$_{15'}$ | $r_{25'}=-33.753$ | $d_{25'}=0.339$ | 1.51011 | 64.2 |
|  | $r_{26'}=-3.746$ | $d_{26'}=0.010$ | Air space | |
| L$_{16'}$ | $r_{27'}=+6.744$ | $d_{27'}=0.291$ | 1.51011 | 64.2 |
|  | $r_{28'}=-19.376$ | $d_{28'}=0.649$ | Air space | |
| V' { L$_{17'}$ | $r_{29'}=+2.128$ | $d_{29'}=0.649$ | 1.50137 | 56.4 |
|  | $r_{30'}=-30.375$ | $d_{30'}=0.676$ | Air space | |
| L$_{18'}$ | $r_{31'}=-3.304$ | $d_{31'}=0.757$ | 1.84666 | 23.8 |
| L$_{19'}$ | $r_{32'}=-1.308$ | $d_{32'}=0.162$ | 1.78470 | 26.1 |
|  | $r_{33'}=+2.497$ | $d_{33'}=0.265$ | Air space | |
| L$_{20'}$ | $r_{34'}=+19.052$ | $d_{34'}=0.486$ | 1.50013 | 61.4 |
|  | $r_{35'}=-2.726$ | $d_{35'}=0.043$ | Air space | |
| L$_{21'}$ | $r_{36'}=+2.528$ | $d_{36'}=0.665$ | 1.50013 | 61.4 |
| L$_{22'}$ | $r_{37'}=-2.165$ | $d_{37'}=0.135$ | 1.80802 | 40.7 |
|  | $r_{38'}=-4.485$ | | | |

[1] Variable.

The individual focal lengths $f_{I'}$ to $f_{V'}$ of the components listed in Table II have the following values:

$$f_{I'}=+7.1222$$
$$f_{II'}=-2.4878$$
$$f_{III'}=-4.1577$$
$$f_{IV'}=+4.4736$$
$$f_{V'}=+4.7399$$

Figure 4:
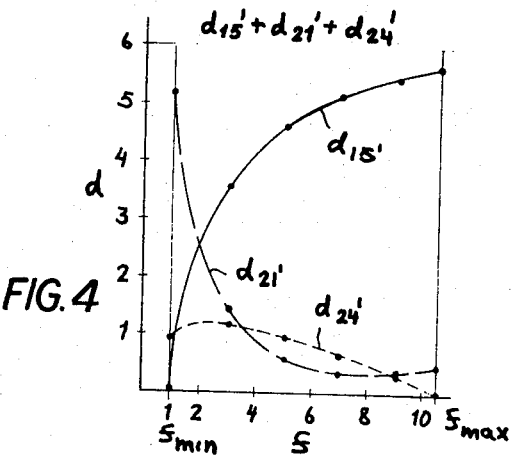

The law of variation of the air spaces $d_{15'}$, $d_{21'}$ and $d_{24'}$ is plotted in FIG. 4. Specific values, based upon six selected magnitudes of the overall focal length $f'$ within its operative range, are listed below:

| $f'$ | Variable air spaces | | |
|---|---|---|---|
|  | $d_{15'}$ | $d_{21'}$ | $d_{24'}$ |
| 1 | 0.020 | 5.205 | 0.919 |
| 3 | 3.533 | 1.466 | 1.156 |
| 5 | 4.607 | 0.570 | 0.978 |
| 7 | 5.161 | 0.338 | 0.656 |
| 9 | 5.491 | 0.374 | 0.290 |
| 10.5 | 5.656 | 0.485 | 0.014 |

Table III represents a system with a relative aperture of 1:2.0 and a back-focal length of 3.71 units. When used in connection with a 16-mm. motion-picture film of frame size 77.5 x 10.3 mm., its focal range may extend from $f_{min}=10$ mm. to $f_{max}=100$ mm.; the image diagonal in that case is 12.74 mm., thus again exceeding the minimum focal length by more than 10%.

TABLE III

| Lenses | Radii | Thicknesses and separations | $n_d$ | $\nu$ |
|---|---|---|---|---|
| I' { L$_{1'}$ | $r_{1'}=+291.262$ | $d_{1'}=0.291$ | 1.62041 | 60.3 |
|  | $r_{2'}=+8.718$ | $d_{2'}=1.291$ | Air space | |
| L$_{2'}$ | $r_{3'}=-11.652$ | $d_{3'}=0.291$ | 1.62041 | 60.3 |
|  | $r_{4'}=+20.039$ | $d_{4'}=0.048$ | Air space | |
| L$_{3'}$ | $r_{5'}=+14.675$ | $d_{5'}=0.723$ | 1.66025 | 32.9 |
|  | $r_{6'}=-32.000$ | $d_{6'}=0.223$ | Air space | |
| L$_{4'}$ | $r_{7'}=-88.155$ | $d_{7'}=1.359$ | 1.71300 | 53.8 |
| L$_{5'}$ | $r_{8'}=-5.620$ | $d_{8'}=0.223$ | 1.72830 | 28.7 |
|  | $r_{9'}=+28.699$ | $d_{9'}=0.194$ | Air space | |
| L$_{6'}$ | $r_{10'}=+70.097$ | $d_{10'}=0.874$ | 1.64050 | 60.1 |
|  | $r_{11'}=-9.287$ | $d_{11'}=0.010$ | Air space | |
| L$_{7'}$ | $r_{12'}=+12.400$ | $d_{12'}=0.660$ | 1.64050 | 60.1 |
|  | $r_{13'}=-166.796$ | $d_{13'}=0.010$ | Air space | |
| L$_{8'}$ | $r_{14'}=+6.028$ | $d_{14'}=0.680$ | 1.64050 | 60.1 |
|  | $r_{15'}=+15.743$ | $d_{15'}=0.079$ | Air space [1] | |
| II' { L$_{9'}$ | $r_{16'}=+5.342$ | $d_{16'}=0.194$ | 1.69100 | 54.7 |
|  | $r_{17'}=+2.183$ | $d_{17'}=0.777$ | Air space | |
| L$_{10'}$ | $r_{18'}=-4.950$ | $d_{18'}=0.301$ | 1.80518 | 25.4 |
| L$_{11'}$ | $r_{19'}=-3.404$ | $d_{19'}=0.194$ | 1.71300 | 53.8 |
| L$_{12'}$ | $r_{20'}=+3.404$ | $d_{20'}=0.379$ | 1.80518 | 25.4 |
|  | $r_{21'}=+11.792$ | $d_{21'}=4.827$ | Air space [1] | |
| III' { L$_{13'}$ | $r_{22'}=-2.767$ | $d_{22'}=0.194$ | 1.71300 | 53.8 |
| L$_{14'}$ | $r_{23'}=+3.636$ | $d_{23'}=0.388$ | 1.68893 | 31.2 |
|  | $r_{24'}=-7.087$ | $d_{24'}=1.654$ | Air space [1] | |
| IV' { L$_{15'}$ | $r_{25'}=+14.571$ | $d_{25'}=0.340$ | 1.52630 | 51.0 |
|  | $r_{26'}=-5.795$ | $d_{26'}=0.010$ | Air space | |
| L$_{16'}$ | $r_{27'}=+4.373$ | $d_{27'}=0.291$ | 1.52249 | 59.5 |
|  | $r_{28'}=+18.675$ | $d_{28'}=0.097$ | Air space | |
| V' { L$_{17'}$ | $r_{29'}=+2.333$ | $d_{29'}=0.583$ | 1.48749 | 70.4 |
|  | $r_{30'}=+19.903$ | $d_{30'}=0.388$ | Air space | |
| L$_{18'}$ | $r_{31'}=-5.871$ | $d_{31'}=0.922$ | 1.84666 | 23.8 |
| L$_{19'}$ | $r_{32'}=-1.715$ | $d_{32'}=0.199$ | 1.75520 | 27.6 |
|  | $r_{33'}=+2.215$ | $d_{33'}=0.437$ | Air space | |
| L$_{20'}$ | $r_{34'}=+5.828$ | $d_{34'}=0.456$ | 1.48749 | 70.4 |
|  | $r_{35'}=-4.211$ | $d_{35'}=0.053$ | Air space | |
| L$_{21'}$ | $r_{36'}=+3.016$ | $d_{36'}=0.680$ | 1.50013 | 61.4 |
| L$_{22'}$ | $r_{37'}=-2.427$ | $d_{37'}=0.136$ | 1.80518 | 25.4 |
|  | $r_{38'}=-5.140$ | | | |

[1] Variable.

The individual focal lengths $f_{I'}$ to $f_{V'}$ of the components listed in Table III have the following values:

$$f_{I'} = +7.0704$$
$$f_{II'} = -2.5723$$
$$f_{III'} = -6.3175$$
$$f_{IV'} = +4.5636$$
$$f_{V'} = +5.3873$$

Figure 5:
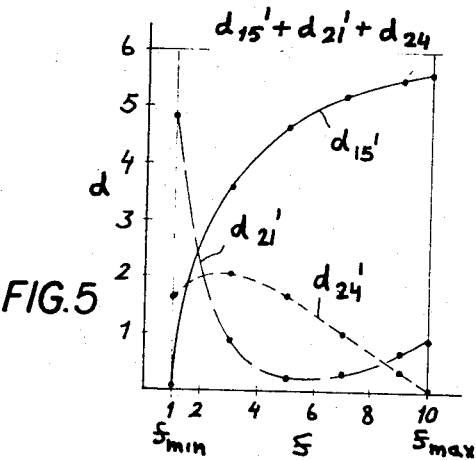

The law of variation of the air spaces $d_{15'}$, $d_{21'}$ and $d_{24'}$ is plotted in FIG. 5. Specific values, based again upon six selected magnitudes of the overall focal length $f'$ within its operative range, are listed below:

| $f'$ | Variable air spaces | | |
|---|---|---|---|
| | $d_{15'}$ | $d_{21'}$ | $d_{24'}$ |
| 1 | 0.079 | 4.827 | 1.654 |
| 3 | 3.609 | 0.885 | 2.066 |
| 5 | 4.681 | 0.225 | 1.654 |
| 7 | 5.213 | 0.333 | 1.015 |
| 9 | 5.512 | 0.691 | 0.356 |
| 10 | 5.614 | 0.904 | 0.041 |

Table IV represents a modification of the system of Table III, having the same image diagonal when used in the aforementioned range of 10–100 mm.; its relative aperture is 1:2.0 and its back-focal length is 3.26 linear units.

TABLE IV

| Lenses | Radii | Thicknesses and separations | $n_d$ | $\nu$ |
|---|---|---|---|---|
| I' { L₁' | $r_{1'} = +288.462$ | $d_{1'} = 0.288$ | 1.62041 | 60.3 |
| | $r_{2'} = +8.635$ | $d_{2'} = 1.279$ | Air space | |
| L₂' | $r_{3'} = -11.558$ | $d_{3'} = 0.288$ | 1.62041 | 60.3 |
| | $r_{4'} = +19.846$ | $d_{4'} = 0.048$ | Air space | |
| L₃' | $r_{5'} = +14.534$ | $d_{5'} = 0.716$ | 1.66025 | 32.9 |
| | $r_{6'} = 31.692$ | $d_{6'} = 0.221$ | Air space | |
| L₄' | $r_{7'} = \infty$ | $d_{7'} = 1.346$ | 1.71300 | 53.8 |
| L₅' | $r_{8'} = -5.566$ | $d_{8'} = 0.221$ | 1.72830 | 28.7 |
| | $r_{9'} = +28.423$ | $d_{9'} = 0.192$ | Air space | |
| L₆' | $r_{10'} = +69.423$ | $d_{10'} = 0.865$ | 1.64050 | 60.1 |
| | $r_{11'} = -9.192$ | $d_{11'} = 0.010$ | Air space | |
| L₇' | $r_{12'} = +12.281$ | $d_{12'} = 0.654$ | 1.64050 | 60.1 |
| | $r_{13'} = -165.192$ | $d_{13'} = 0.010$ | Air space | |
| L₈' | $r_{14'} = +6.337$ | $d_{14'} = 0.673$ | 1.64050 | 60.1 |
| | $r_{15'} = +15.591$ | $d_{15'} = 0.102$ | Air space ¹ | |
| II' { L₉' | $r_{16'} = +6.939$ | $d_{16'} = 0.192$ | 1.69100 | 54.7 |
| | $r_{17'} = +2.444$ | $d_{17'} = 0.683$ | Air space | |
| L₁₀' | $r_{18'} = -5.086$ | $d_{18'} = 0.269$ | 1.80518 | 25.4 |
| | $r_{19'} = -3.106$ | $d_{19'} = 0.192$ | 1.71300 | 53.8 |
| L₁₁' | $r_{20'} = +3.106$ | $d_{20'} = 0.346$ | 1.80518 | 25.4 |
| L₁₂' | $r_{21'} = +8.496$ | $d_{21'} = 5.121$ | Air space ¹ | |
| III' { L₁₃' | $r_{22'} = -2.356$ | $d_{22'} = 0.163$ | 1.71300 | 53.8 |
| | $r_{23'} = +3.388$ | $d_{23'} = 0.413$ | 1.72151 | 29.3 |
| L₁₄' | $r_{24'} = -14.321$ | $d_{24'} = 0.940$ | Air space ¹ | |
| IV' { L₁₅' | $r_{25'} = -33.894$ | $d_{25'} = 0.336$ | 1.51009 | 63.5 |
| | $r_{26'} = -3.719$ | $d_{26'} = 0.010$ | Air space | |
| L₁₆' | $r_{27'} = +6.234$ | $d_{27'} = 0.288$ | 1.51009 | 63.5 |
| | $r_{28'} = -24.865$ | $d_{28'} = 0.096$ | Air space | |

See footnote at end of table.

TABLE IV—Continued

| Lenses | Radii | Thicknesses and separations | $n_d$ | $\nu$ |
|---|---|---|---|---|
| V' { L₁₇' | $r_{29'} = +1.952$ | $d_{29'} = 0.702$ | 1.48606 | 81.5 |
| | $r_{30'} = +77.836$ | $d_{30'} = 0.635$ | Air space | |
| L₁₈' | $r_{31'} = -2.840$ | $d_{31'} = 0.707$ | 1.72151 | 29.3 |
| L₁₉' | $r_{32'} = -1.257$ | $d_{32'} = 0.154$ | 1.73627 | 32.2 |
| | $r_{33'} = +2.333$ | $d_{33'} = 0.250$ | Air space | |
| L₂₀' | $r_{34'} = +10.767$ | $d_{34'} = 0.442$ | 1.48606 | 81.5 |
| | $r_{35'} = -2.301$ | $d_{35'} = 0.038$ | Air space | |
| L₂₁' | $r_{36'} = +2.505$ | $d_{36'} = 0.548$ | 1.52122 | 62.8 |
| | $r_{37'} = -2.884$ | $d_{37'} = 0.125$ | 1.78470 | 26.1 |
| L₂₂' | $r_{38'} = -8.554$ | | | |

¹ Variable.

The individual focal lengths $f_{I'}$ to $f_{V'}$ of the components listed in Table IV have the following values:

$$f_{I'} = +7.0704$$
$$f_{II'} = -2.4691$$
$$f_{III'} = -4.0871$$
$$f_{IV'} = +4.4412$$
$$f_{V'} = +4.7420$$

Figure 6:
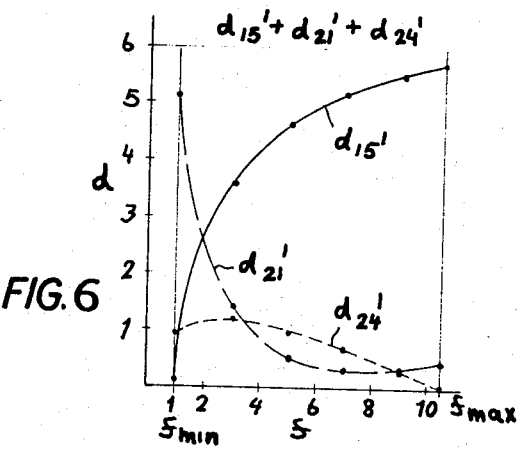

The law of variation of the air spaces $d_{15'}$, $d_{21'}$ and $d_{24'}$ is plotted in FIG. 6. Specific values for six positions are listed below:

| $f'$ | Variable air spaces | | |
|---|---|---|---|
| | $d_{15'}$ | $d_{21'}$ | $d_{24'}$ |
| 1 | 0.102 | 5.121 | 0.940 |
| 3 | 3.575 | 1.415 | 1.173 |
| 5 | 4.652 | 0.522 | 0.998 |
| 7 | 5.194 | 0.289 | 0.679 |
| 9 | 5.523 | 0.324 | 0.316 |
| 10.5 | 5.688 | 0.432 | 0.042 |

Table V relates to the system of FIG. 1A, with a relative aperture of 1:2.0 and a back-focal length of 4.69 units.

TABLE V

| Lenses | Radii | Thicknesses and separations | $n_d$ | $\nu$ |
|---|---|---|---|---|
| I' { L₁'' | $r_{1''} = -55.340$ | $d_{1''} = 0.376$ | 1.62041 | 60.3 |
| | $r_{2''} = +6.980$ | $d_{2''} = 0.269$ | Air space | |
| L₂'' | $r_{3''} = +7.040$ | $d_{3''} = 0.753$ | 1.62004 | 36.4 |
| | $r_{4''} = +17.619$ | $d_{4''} = 0.430$ | Air space | |
| L₃'' | $r_{5''} = +429.278$ | $d_{5''} = 1.237$ | 1.62041 | 60.3 |
| L₄'' | $r_{6''} = -6.980$ | $d_{6''} = 0.387$ | 1.72830 | 28.7 |
| | $r_{7''} = +11.525$ | $d_{7''} = 1.129$ | Air space | |
| L₅'' | $r_{8''} = +60.127$ | $d_{8''} = 0.807$ | 1.64050 | 60.1 |
| | $r_{9''} = -13.214$ | $d_{9''} = 0.010$ | Air space | |
| L₆'' | $r_{10''} = +12.832$ | $d_{10''} = 0.968$ | 1.64050 | 60.1 |
| | $r_{11''} = -23.018$ | $d_{11''} = 0.010$ | Air space | |
| L₇'' | $r_{12''} = +8.920$ | $d_{12''} = 0.807$ | 1.64050 | 60.1 |
| | $r_{13''} = \infty$ | $d_{13''} = 0.041$ | Air space ¹ | |

See footnote at end of table.

TABLE V—Continued

| Lenses | | Radii | Thickness and separations | $n_d$ | $v$ |
|---|---|---|---|---|---|
| | $L_{8''}$ | $r_{14''}=+6.980$ | $d_{14''}=0.194$ | 1.69100 | 54.7 |
| | | $r_{15''}=+2.298$ | $d_{15''}=0.640$ | Air space | |
| II'' | $L_{9''}$ | $r_{16''}=-5.841$ | $d_{16''}=0.298$ | 1.80518 | 25.4 |
| | | $r_{17''}=-3.204$ | $d_{17''}=0.194$ | 1.71300 | 53.8 |
| | $L_{10''}$ | $r_{18''}=+3.204$ | $d_{18''}=0.376$ | 1.80518 | 25.4 |
| | $L_{11''}$ | $r_{19''}=+8.508$ | $d_{19''}=5.160$ | Air space [1] | |
| III'' | $L_{12''}$ | $r_{20''}=-2.500$ | $d_{20''}=0.161$ | 1.71300 | 53.8 |
| | $L_{13''}$ | $r_{21''}=+2.691$ | $d_{21''}=0.418$ | 1.72151 | 29.3 |
| | | $r_{22''}=-19.711$ | $d_{22''}=0.993$ | Air space [1] | |
| IV'' | $L_{14''}$ | $r_{23''}=-33.586$ | $d_{23''}=0.338$ | 1.62041 | 60.3 |
| | | $r_{24''}=-3.727$ | $d_{24''}=0.010$ | Air space | |
| | $L_{15''}$ | $r_{25''}=+6.745$ | $d_{25''}=0.289$ | 1.62041 | 60.3 |
| | | $r_{26''}=+33.586$ | $d_{26''}=0.538$ | Air space | |
| V'' | $L_{16''}$ | $r_{27''}=-2.472$ | $d_{27''}=0.145$ | 1.62299 | 58.1 |
| | $L_{17''}$ | $r_{28''}=+5.380$ | $d_{28''}=0.366$ | 1.71736 | 29.5 |
| | | $r_{29''}=-10.549$ | $d_{29''}=0.124$ | Air space | |
| | $L_{18''}$ | $r_{30''}=+9.148$ | $d_{30''}=0.339$ | 1.55963 | 61.2 |
| | | $r_{31''}=-6.192$ | $d_{31''}=0.024$ | Air space | |
| | $L_{19''}$ | $r_{32''}=+5.758$ | $d_{32''}=0.680$ | 1.51680 | 64.2 |
| | | $r_{33''}=-6.909$ | $d_{33''}=0.656$ | Air space | |
| | $L_{20''}$ | $r_{34''}=-7.110$ | $d_{34''}=0.151$ | 1.78470 | 26.1 |
| | | $r_{35''}=+3.453$ | $d_{35''}=0.175$ | Air space | |
| | $L_{21''}$ | $r_{36''}=+19.280$ | $d_{36''}=0.516$ | 1.51680 | 64.2 |
| | | $r_{37''}=-3.891$ | $d_{37''}=0.012$ | Air space | |
| | $L_{22''}$ | $r_{38''}=+6.822$ | $d_{38''}=0.600$ | 1.69100 | 54.7 |
| | $L_{23''}$ | $r_{39''}=-2.557$ | $d_{39''}=0.145$ | 1.72830 | 28.7 |
| | | $r_{40''}=-9.616$ | | | |

[1] Variable.

The individual focal lengths $f_{I''}$ to $f_{V''}$ of the components listed in Table VI have the following values:

$$f_{I''}=+7.0945$$
$$f_{II''}=-2.4764$$
$$f_{III''}=-4.1359$$
$$F_{IV''}=+4.4644$$
$$f_{V''}=+4.7325$$

Figure 7:
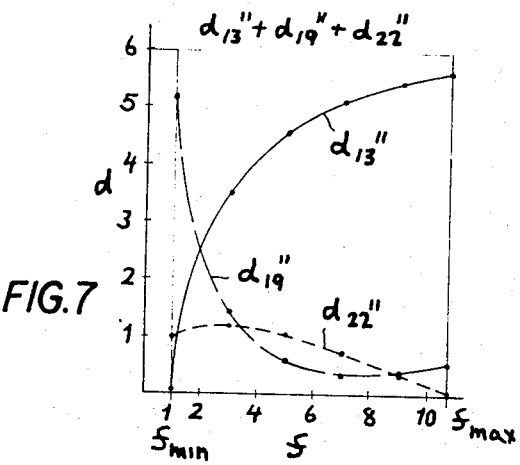

The law of variation of the air spaces $d_{13''}$, $d_{19''}$ and $d_{22''}$ is plotted in FIG. 7. Specific values for six selected magnitudes of the overall focal length $f''$, are listed below:

| $f''$ | Variable air spaces | | |
|---|---|---|---|
| | $d_{13''}$ | $d_{19''}$ | $d_{22''}$ |
| 1 | 0.041 | 5.160 | 0.993 |
| 3 | 3.515 | 1.459 | 1.221 |
| 5 | 4.577 | 0.577 | 1.041 |
| 7 | 5.122 | 0.351 | 0.721 |
| 9 | 5.447 | 0.390 | 0.358 |
| 10.75 | 5.632 | 0.523 | 0.040 |

Table VI represents a system as shown in FIG. 2A with a relative aperture of 1:2.0 and a back-focal length of 4.84 units.

TABLE VI

| Lenses | | Radii | Thicknesses and separations | $n_d$ | $v$ |
|---|---|---|---|---|---|
| I''' | $L_{1'''}$ | $r_{1'''}=+554.887$ | $d_{1'''}=0.262$ | 1.62041 | 60.3 |
| | | $r_{2'''}=+7.933$ | $d_{2'''}=1.174$ | Air space | |
| | $L_{2'''}$ | $r_{3'''}=-10.411$ | $d_{3'''}=0.262$ | 1.62041 | 60.3 |
| | | $r_{4'''}=+17.930$ | $d_{4'''}=0.044$ | Air space | |
| | $L_{3'''}$ | $r_{5'''}=+13.151$ | $d_{5'''}=0.621$ | 1.66025 | 32.9 |
| | | $r_{6'''}=-29.207$ | $d_{6'''}=0.245$ | Air space | |
| | $L_{4'''}$ | $r_{7'''}=+167.122$ | $d_{7'''}=1.052$ | 1.71300 | 53.8 |
| | $L_{5'''}$ | $r_{8'''}=-5.105$ | $d_{8'''}=0.245$ | 1.72830 | 28.7 |
| | | $r_{9'''}=+24.290$ | $d_{9'''}=0.176$ | Air space | |
| | $L_{6'''}$ | $r_{10'''}=+73.874$ | $d_{10'''}=0.709$ | 1.64050 | 60.1 |
| | | $r_{11'''}=-8.231$ | $d_{11'''}=0.010$ | Air space | |
| | $L_{7'''}$ | $r_{12'''}=+10.734$ | $d_{12'''}=0.528$ | 1.64050 | 60.1 |
| | | $r_{13'''}=-390.505$ | $d_{13'''}=0.010$ | Air space | |
| | $L_{8'''}$ | $r_{14'''}=+5.723$ | $d_{14'''}=0.587$ | 1.64050 | 60.1 |
| | | $r_{15'''}=+14.256$ | $d_{15'''}=0.027$ | Air space [1] | |
| II''' | $L_{9'''}$ | $r_{16'''}=+6.349$ | $d_{16'''}=0.176$ | 1.69100 | 54.7 |
| | | $r_{17'''}=+2.241$ | $d_{17'''}=0.621$ | Air space | |
| | $L_{10'''}$ | $r_{18'''}=-4.573$ | $d_{18'''}=0.245$ | 1.80518 | 25.4 |
| | $L_{11'''}$ | $r_{19'''}=-2.784$ | $d_{19'''}=0.176$ | 1.71300 | 53.8 |
| | $L_{12'''}$ | $r_{20'''}=+2.784$ | $d_{20'''}=0.318$ | 1.80518 | 25.4 |
| | | $r_{21'''}=+7.740$ | $d_{21'''}=0.4711$ | Air space [1] | |
| III''' | $L_{13'''}$ | $r_{22'''}=-2.187$ | $d_{22'''}=0.147$ | 1.71300 | 53.8 |
| | $L_{14'''}$ | $r_{23'''}=+3.013$ | $d_{23'''}=0.380$ | 1.72151 | 29.3 |
| | | $r_{24'''}=-13.796$ | $d_{24'''}=0.832$ | Air space [1] | |
| IV''' | $L_{15'''}$ | $r_{25'''}=-30.553$ | $d_{25'''}=0.307$ | 1.51011 | 64.2 |
| | | $r_{26'''}=-3.390$ | $d_{26'''}=0.009$ | Air space | |
| | $L_{16'''}$ | $r_{27'''}=+6.545$ | $d_{27'''}=0.263$ | 1.51011 | 64.2 |
| | | $r_{28'''}=-15.078$ | $d_{28'''}=0.489$ | Air space | |
| V''' | $L_{17'''}$ | $r_{29'''}=-2.477$ | $d_{29'''}=0.147$ | 1.62374 | 47.0 |
| | $L_{18'''}$ | $r_{30'''}=+5.399$ | $d_{30'''}=0.367$ | 1.71736 | 29.5 |
| | | $r_{31'''}=-10.391$ | $d_{31'''}=0.125$ | Air space | |
| | $L_{19'''}$ | $r_{32'''}=+9.533$ | $d_{32'''}=0.338$ | 1.56470 | 55.9 |
| | | $r_{33'''}=-6.080$ | $d_{33'''}=0.025$ | Air space | |
| | $L_{20'''}$ | $r_{34'''}=+5.793$ | $d_{34'''}=0.680$ | 1.51680 | 64.2 |
| | | $r_{35'''}=-6.904$ | $d_{35'''}=0.656$ | Air space | |
| | $L_{21'''}$ | $r_{36'''}=-7.342$ | $d_{36'''}=0.152$ | 1.78470 | 26.1 |
| | | $r_{37'''}=+3.390$ | $d_{37'''}=0.176$ | Air space | |
| | $L_{22'''}$ | $r_{38'''}=+25.636$ | $d_{38'''}=0.516$ | 1.51680 | 64.2 |
| | | $r_{39'''}=-3.899$ | $d_{39'''}=0.012$ | Air space | |
| | $L_{23'''}$ | $r_{40'''}=+5.779$ | $d_{40'''}=0.599$ | 1.68273 | 44.5 |
| | $L_{24'''}$ | $r_{41'''}=-2.557$ | $d_{41'''}=0.147$ | 1.72830 | 28.7 |
| | | $r_{42'''}=-9.596$ | | | |

[1] Variable.

The individual focal lengths $f_{I'''}$ to $f_{V'''}$ of the components listed in Table VI have the following values:

$$f_{I'''}=+6.4479$$
$$f_{II'''}=-2.2517$$
$$f_{III'''}=-3.7655$$
$$f_{IVV'''}=+4.0490$$
$$f_{V'''}=+4.7514$$

Figure 8:
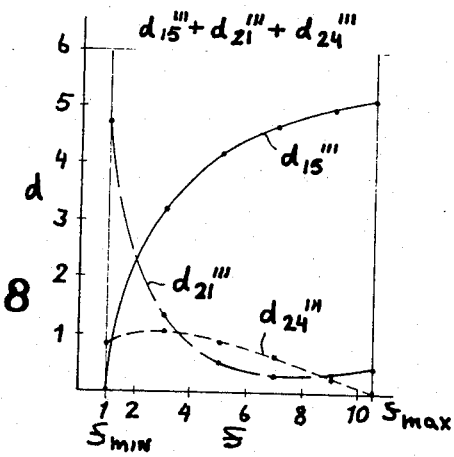

The law of variation of the air spaces $d_{15'''}$, $d_{21'''}$ and $d_{24'''}$ is plotted in FIG. 8. Six specific values, based upon selected magnitudes of the overall focal length $f'''$, are listed below:

| $f'''$ | Variable air spaces | | |
|---|---|---|---|
| | $d_{15}'''$ | $d_{21}'''$ | $d_{24}'''$ |
| 1 | 0.027 | 4.711 | 0.832 |
| 3 | 3.198 | 1.327 | 1.046 |
| 5 | 4.170 | 0.516 | 0.885 |
| 7 | 4.672 | 0.306 | 0.594 |
| 9 | 4.970 | 0.339 | 0.263 |
| 10.5 | 5.120 | 0.439 | 0.013 |

The systems of Tables V and VI may be used for the same 16-mm. motion-picture films as those of Tables III and IV.

The basic objective illustrated in FIGS. 1A and 2A may also be modified by omission of the final doublet $L_{22}''/L_{23}''$ or $L_{23}'''/L_{24}'''$. Thus, according to a further embodiment, components I'' to IV'' may have the numerical values listed in Table I for the corresponding constituents of FIG. 1 whereas the truncated basic objective may be designed in accordance with the following data:

| Lenses | Radii | Thicknesses and Separations | $n_d$ | $\nu$ |
|---|---|---|---|---|
| $L_{16}''$ | $r_{27}''=-2.485$ | $d_{27}''=0.146$ | 1.62041 | 60.3 |
| $L_{17}''$ | $r_{28}''=+5.408$ | $d_{28}''=0.368$ | 1.71736 | 29.5 |
| | $r_{29}''=-11.352$ | $d_{29}''=0.124$ | Air space | |
| $L_{18}''$ | $r_{30}''=+8.965$ | $d_{30}''=0.341$ | 1.55232 | 63.5 |
| | $r_{31}''=-6.324$ | $d_{31}''=0.024$ | Air space | |
| $L_{19}''$ | $r_{32}''=+5.928$ | $d_{32}''=0.684$ | 1.51680 | 64.2 |
| | $r_{33}''=-6.827$ | $d_{33}''=0.659$ | Air space | |
| $L_{20}''$ | $r_{34}''=-6.891$ | $d_{34}''=0.151$ | 1.78470 | 26.1 |
| | $r_{35}''=+3.536$ | $d_{35}''=0.176$ | Air space | |
| $L_{21}''$ | $r_{36}''=+16.239$ | $d_{36}''=0.519$ | 1.51680 | 64.2 |
| | $r_{37}''=-3.976$ | | | |

Such a system has relative aperture of 1"2.0 and a back-focal length of 4.45 linear units; the law of variation of its air spaces $d_{13}''$, $d_{19}''$ and $d_{22}''$ is course, the same as in the system of Table I.

The positive singlet $L_2$ or $L_3'$ is designed to compensate the relatively large aberrations occurring at the image-side surfaces of the preceding dispersive singlet or singlets $L_1$ or $L_1'$, $L_2'$. The collective effect of this positive singlet is partly eliminated in the paraxial zone by the following dispersive doublet whose cemented surface helps suppress the chromatic aberrations, particularly toward the upper end of the varifocal range.

In the three compound lens members of the varifocal attachment, the first lens $L_3$, $L_{12}$ (or $L_4'$, $L_{13'}$) of each doublet and the middle lens $L_{10}$ (or $L_{11'}$) of the triplet have a relatively high Abbé number as compared with the other lenses cemented thereto. Also, the cemented surfaces of the triplet are both positively refracting whereas that of the first doublet is negatively refracting; the cemented surfaces of the second doublet may be of either positively (Tables I, II and IV–VI) or negatively refracting (Table III) and, in fact, could also have zero power.

Although the embodiments described and illustrated provide a high degree of correction, particularly for chromatic aberrations, further refinements are possible by substituting compound lenses for some of the singlets and/or by separating the illustrated doublets and triplets into closely spaced individual lenses with confronting surfaces having slightly differing radii of curvature. Such modifications, readily apparent to persons skilled in the art, are intended to be embraced within the spirit and scope of my invention as defined in the appended claims.

I claim:

1. A varifocal objective system comprising a basic multilens objective and a varifocal front attachment for said objective, said attachment consisting of a substantially fixed positive first component, an axially movable negative second component, an axially movable negative third component and a fixed positive fourth component; said first component consisting of dispersive front lens means, a collective singlet following said front lens means, a dispersive doublet following said collective singlet, and a group of three air-spaced positive singlets following said doublet; said second component consisting of a negative singlet and a negative triplet; said third component consisting of a dispersive lens member; said fourth component consisting of two air-spaced collective singlets; the absolute values of the individual focal lengths of said first and third components substantially exceeding those of said fourth and second components, respectively; said basic objective consisting of a positive first lens, a dispersive doublet composed of a positive second lens and a negative third lens, a positive fourth lens and collective doublet composed of a positive fifth lens and a negative sixth lens; the numerical values of the radii $r_{27}$ to $r_{36}$ of said first lens $L_{16}$, said second lens $L_{17}$, said third lens $L_{18}$, said fourth lens $L_{19}$, said fifth lens $L_{20}$ and said sixth lens $L_{21}$, and of the axial thicknesses and separations $d_{27}$ to $d_{35}$ thereof, based upon a numerical value of 1 for a minimum overall focal length of the system, the refractive indices $n_d$ of said lenses and their Abbé numbers $\nu$ being substantially as given in the following table:

| Lenses | Radii | Thicknesses and separations | $n_d$ | $\nu$ |
|---|---|---|---|---|
| $L_{16}$ | $r_{27}=+1.9$ | $d_{27}=0.70$ | 1.49 | 81 |
| | $r_{28}=+77.5$ | $d_{28}=0.63$ | Air space | |
| $L_{17}$ | $r_{29}=-2.8$ | $d_{29}=0.70$ | 1.81 | 25 |
| $L_{18}$ | $r_{30}=-1.3$ | $d_{30}=0.15$ | 1.74 | 32 |
| | $r_{31}=+2.3$ | $d_{31}=0.25$ | Air space | |
| $L_{19}$ | $r_{32}=+10.7$ | $d_{32}=0.44$ | 1.49 | 81 |
| | $r_{33}=-2.3$ | $d_{33}=0.04$ | Air space | |
| $L_{20}$ | $r_{34}=+2.5$ | $d_{34}=0.55$ | 1.52 | 62 |
| $L_{21}$ | $r_{35}=-2.9$ | $d_{35}=0.13$ | 1.78 | 26 |
| | $r_{36}=-8.5$ | | | |

2. A varifocal objective system comprising a basic multilens objective and a varifocal front attachment for said objective, said attachment consisting of a substantially fixed positive first component, an axially movable negative second component, an axially movable negative third component and a fixed positive fourth component; said first component consisting of dispersive front lens means, a collective singlet following said front lens means, a dispersive doublet following said collective singlet, and a group of three air-spaced positive singlets following said doublet; said second component consisting of a negative singlet and a negative triplet; said third component consisting of a dispersive lens member; said fourth component consisting of two air-spaced collective singlets; the absolute values of the individual focal lengths of said first and third components substantially exceeding those of said fourth and second components, respectively; said basic objective consisting of a positive first lens, a dispersive doublet composed of a positive second lens and a negative third lens, a positive fourth lens and a collective doublet composed of a positive fifth lens and a negative sixth lens; the numerical values of the radii $r_{29'}$ to $r_{38'}$ of said first lens $L_{17'}$, said second lens $L_{18'}$, said third lens $L_{19'}$, said fourth lens $L_{20'}$, said fifth lens $L_{21'}$, and said sixth lens $L_{22'}$, and of the axial thicknesses and separations $d_{29'}$ to $d_{37'}$ thereof, based upon a numerical value of 1 for a minimum overall focal length of the system, the refractive indices $n_d$ of said lenses and their Abbé numbers $\nu$ being substantially as given in the following table:

| Lenses | Radii | Thicknesses and separations | $n_d$ | $\nu$ |
|---|---|---|---|---|
| $L_{17'}$ | $r_{29'}=+2.1$ | $d_{29'}=0.65$ | 1.50 | 56 |
|  | $r_{30'}=-30.4$ | $d_{30'}=0.68$ | Air space |  |
| $L_{18'}$ | $r_{31'}=-3.3$ | $d_{31'}=0.76$ | 1.85 | 23 |
|  | $r_{32'}=-1.3$ | $d_{32'}=0.16$ | 1.78 | 26 |
| $L_{19'}$ | $r_{33'}=+2.5$ | $d_{33'}=0.27$ | Air space |  |
| $L_{20'}$ | $r_{34'}=+19.1$ | $d_{34'}=0.49$ | 1.50 | 61 |
|  | $r_{35'}=-2.7$ | $d_{35'}=0.04$ | Air space |  |
| $L_{21'}$ | $r_{36'}=+2.5$ | $d_{36'}=0.67$ | 1.50 | 61 |
|  | $r_{37'}=-2.2$ | $d_{37'}=0.14$ | 1.81 | 41 |
| $L_{22'}$ | $r_{38'}=-4.5$ |  |  |  |

3. A varifocal objective system comprising a basic multilens objective and a varifocal front attachment for said objective, said attachment consisting of a substantially fixed positive first component, an axially movable negative second component, an axially movable negative third component and a fixed positive fourth component; said first component consisting of dispersive front lens means, a collective singlet following said front lens means, a dispersive doublet following said collective singlet, and a group of three air-spaced positive singlets following said doublet; said second component consisting of a negative singlet and a negative triplet; said third component consisting of a dispersive lens member; said fourth component consisting of two air-spaced collective singlets; the absolute values of the individual focal lengths of said first and third components substantially exceeding those of said fourth and second components, respectively; said basic objective consisting of a positive first lens, a dispersive doublet composed of a positive second lens and a negative third lens, a positive fourth lens and a collective doublet composed of a positive fifth lens and a negative sixth lens; the numerical values of the radii $r_{29'}$ to $r_{38'}$ of said first lens $L_{17'}$, said second lens $L_{18'}$, said third lens $L_{19'}$, said fourth lens $L_{20'}$ said fifth lens $L_{21'}$ and said sixth lens $L_{22'}$, and of the axial thicknesses and separations $d_{29'}$ to $d_{37'}$ thereof, based upon a numerical value of 1 for a minimum overall focal length of the system, the refractive indices $n_d$ of said lenses and their Abbé numbers $\nu$ being substantially as given in the following table:

| Lenses | Radii | Thicknesses and separations | $n_d$ | $\nu$ |
|---|---|---|---|---|
| $L_{17'}$ | $r_{29'}=+2.3$ | $d_{29'}=0.58$ | 1.49 | 70 |
|  | $r_{30'}=+19.9$ | $d_{30'}=0.39$ | Air space |  |
| $L_{18'}$ | $r_{31'}=-5.9$ | $d_{31'}=0.92$ | 1.85 | 24 |
|  | $r_{32'}=-1.7$ | $d_{32'}=0.20$ | 1.78 | 28 |
| $L_{19'}$ | $r_{33'}=+2.2$ | $d_{33'}=0.44$ | Air space |  |
| $L_{20'}$ | $r_{34'}=+5.8$ | $d_{34'}=0.46$ | 1.49 | 70 |
|  | $r_{35'}=-4.2$ | $d_{35'}=0.05$ | Air space |  |
| $L_{21'}$ | $r_{36'}=+3.0$ | $d_{36'}=0.68$ | 1.50 | 61 |
|  | $r_{37'}=-2.4$ | $d_{37'}=0.14$ | 1.81 | 25 |
| $L_{22'}$ | $r_{38'}=-5.1$ |  |  |  |

4. A varifocal objective system comprising a basic multilens objective and a varifocal front attachment for said objective, said attachment consisting of a substantially fixed positive first component, an axially movable negative second component, an axially movable negative third component and a fixed positive fourth component; said first component consisting of dispersive front lens means, a collective singlet following said front lens means, a dispersive doublet following said collective singlet, and a group of three air-spaced positive singlets following said doublet; said second component consisting of a negative singlet and a negative triplet; said third component consisting of a dispersive lens member; said fourth component consisting of two air-spaced collective singlets; the absolute values of the individual focal lengths of said first and third components substantially exceeding those of said fourth and second components, respectively; said basic objective consisting of a positive first lens, a dispersive doublet composed of a positive second lens and a negative third lens, a positive fourth lens and a collective doublet composed of a positive fifth lens and a negative sixth lens; the numerical values of the radii $r_{29'}$ to $r_{38'}$ of said first lens $L_{17'}$, said second lens $L_{18'}$, said third lens $L_{19'}$, said fourth lens $L_{20'}$, said fifth lens $L_{21'}$ and said sixth lens $L_{22'}$, and of the axial thicknesses and separations $d_{29'}$ to $d_{37'}$ thereof, based upon a numerical value of 1 for a minimum overall focal length of the system, the refractive indices $n_d$ of said lenses and their Abbé numbers $\nu$ being substantially as given in the following table:

| Lenses | Radii | Thicknesses and separations | $n_d$ | $\nu$ |
|---|---|---|---|---|
| $L_{17'}$ | $r_{29'}=+2.0$ | $d_{29'}=0.70$ | 1.49 | 82 |
|  | $r_{30'}=+77.8$ | $d_{30'}=0.64$ | Air space |  |
| $L_{18'}$ | $r_{31'}=-2.8$ | $d_{31'}=0.71$ | 1.72 | 29 |
| $L_{19'}$ | $r_{32'}=-1.3$ | $d_{32'}=0.15$ | 1.74 | 32 |
|  | $r_{33'}=+2.3$ | $d_{33'}=0.25$ | Air space |  |
| $L_{20'}$ | $r_{34'}=+10.8$ | $d_{34'}=0.44$ | 1.49 | 82 |
|  | $r_{35'}=-2.3$ | $d_{35'}=0.04$ | Air space |  |
| $L_{21'}$ | $r_{36'}=+2.5$ | $d_{36'}=0.55$ | 1.52 | 63 |
| $L_{22'}$ | $r_{37'}=-2.9$ | $d_{37'}=0.13$ | 1.78 | 26 |
|  | $r_{38'}=-8.5$ |  |  |  |

5. A varifocal objective system comprising a basic multilens objective and a varifocal front attachment for said objective, said attachment consisting of a substantially fixed positive first component, an axially movable negative second component, an axially movable negative third component and a fixed positive fourth component; said first component consisting of dispersive front lens means, a collective singlet following said front lens means, a dispersive doublet following said collective singlet, and a group of three air-spaced positive singlets following said doublet; said second component consisting of a negative singlet and a negative triplet; said third component consisting of a dispersive lens member; said fourth component consisting of two air-spaced collective singlets; the absolute values of the individual focal lengths of said first and third components substantially exceeding those of said fourth and second components, respectively; said basic objective consisting of a dispersive doublet composed of a negative first lens and a positive second lens, a positive third lens, a positive fourth lens, a negative fifth lens, a positive sixth lens and a collective doublet composed of a positve seventh lens and a negative eighth lens; the numerical values of the radii $r_{27''}$ to $r_{40}$ of said first lens $L_{16''}$, said second lens $L_{17''}$, said third lens $L_{18''}$, said fourth lens $L_{19''}$, said fifth lens $L_{20''}$, said sixth lens $L_{21''}$, said seventh lens $L_{22''}$ and said eighth lens $L_{23''}$, and of the axial thicknesses and separations $d_{27''}$ to $d_{39''}$ thereof, based upon a numerical value of 1 for a minimum overall focal length of the system, the refractive indices $n_d$ of said lenses of their Abbé numbers $v$ being substantially as given in the following table:

| Lenses | Radii | Thicknesses and separations | $n_d$ | $v$ |
|---|---|---|---|---|
| $L_{16''}$ | $r_{27''}=-2.5$ | $d_{27''}=0.15$ | 1.62 | 58 |
| $L_{17''}$ | $r_{28''}=+5.4$ | $d_{28''}=0.37$ | 1.72 | 30 |
| | $r_{29''}=-10.5$ | $d_{29''}=0.12$ | Air space | |
| $L_{18''}$ | $r_{30''}=+9.1$ | $d_{30''}=0.34$ | 1.56 | 61 |
| | $r_{31''}=-6.2$ | $d_{31''}=0.02$ | Air space | |
| $L_{19''}$ | $r_{32''}=+5.8$ | $d_{32''}=0.68$ | 1.52 | 64 |
| | $r_{33''}=-6.9$ | $d_{33''}=0.66$ | Air space | |
| $L_{20''}$ | $r_{34''}=-7.1$ | $d_{34''}=0.15$ | 1.78 | 26 |
| | $r_{35''}=+3.5$ | $d_{35''}=0.18$ | Air space | |
| $L_{21''}$ | $r_{36''}=+19.3$ | $d_{36''}=0.52$ | 1.52 | 64 |
| | $r_{37''}=-3.9$ | $d_{37''}=0.01$ | Air space | |
| $L_{22''}$ | $r_{38''}=+6.8$ | $d_{38''}=0.60$ | 1.69 | 55 |
| $L_{23''}$ | $r_{39''}=-2.6$ | $d_{39''}=0.15$ | 1.73 | 29 |
| | $r_{40''}=-9.6$ | | | |

6. A varifocal objective system comprising a basic multilens objective and a varifocal front attachment for said objective, said attachment consisting of a substantially fixed positive first component, an axially movable negative second component, an axially movable negative third component and a fixed positive fourth component; said first component consisting of dispersive front lens means, a collective singlet following said front lens means, a dispersive doublet following said collective singlet, and a group of three air-spaced positive singlets following said doublet; said second component consisting of a negative singlet and a negative triplet; said third component consisting of a dispersive lens member; said fourth component consisting of two air-spaced collective singlets; the absolute values of the individual focal lengths of said first and third components substantially exceeding those of said fourth and second components, respectively; said basic objective consisting of a dispersive doublet composed of a negative first lens and a positive second lens, a positive third lens, a positive fourth lens, a negative fifth lens, a positive sixth lens and a collective doublet composed of a positive seventh lens and a negative eighth lens; the numerical values of the radii $r_{29'''}$ to $r_{42'''}$ of said first lens $L_{17'''}$, said second lens $L_{18'''}$, said third lens $L_{19'''}$, said fourth lens $L_{20'''}$, said fifth lens $L_{21'''}$, said sixth lens $L_{22'''}$, said seventh lens $L_{23'''}$ and said eighth lens $L_{24'''}$, and of the axial thicknesses and separations $d_{29'''}$ to $d_{41'''}$ thereof, based upon a numerical value of 1 for a minimum overall focal length of the system, the refractive indices $n_d$ of said lenses and their Abbé numbers $v$ being substantially as given in the following table:

| Lenses | Radii | Thicknesses and separations | $n_d$ | $v$ |
|---|---|---|---|---|
| $L_{17'''}$ | $r_{29'''}=-2.5$ | $d_{29'''}=0.15$ | 1.62 | 47 |
| $L_{18'''}$ | $r_{30'''}=+5.4$ | $d_{30'''}=0.37$ | 1.72 | 30 |
| | $r_{31'''}=-10.4$ | $d_{31'''}=0.13$ | Air space | |
| $L_{19'''}$ | $r_{32'''}=+9.5$ | $d_{32'''}=0.34$ | 1.56 | 56 |
| | $r_{33'''}=-6.1$ | $d_{33'''}=0.03$ | Air space | |
| $L_{20'''}$ | $r_{34'''}=+5.8$ | $d_{34'''}=0.68$ | 1.52 | 64 |
| | $r_{35'''}=-6.9$ | $d_{35'''}=0.66$ | Air space | |
| $L_{21'''}$ | $r_{36'''}=-7.3$ | $d_{36'''}=0.15$ | 1.78 | 26 |
| | $r_{37'''}=+3.4$ | $d_{37'''}=0.18$ | Air space | |
| $L_{22'''}$ | $r_{38'''}=+25.6$ | $d_{38'''}=0.52$ | 1.52 | 64 |
| | $r_{39'''}=-3.9$ | $d_{39'''}=0.01$ | Air space | |
| $L_{23'''}$ | $r_{40'''}=+5.8$ | $d_{40'''}=0.60$ | 1.68 | 45 |
| $L_{24'''}$ | $r_{41'''}=-2.6$ | $d_{41'''}=0.15$ | 1.73 | 29 |
| | $r_{42'''}=-9.6$ | | | |

7. A varifocal objective system comprising a basic multilens objective and a varifocal front attachment for said objective, said attachment consisting of a substantially fixed positive first component, an axially movable negative second component, an axially movable negative third component and a fixed positive fourth component; said first component consisting of dispersive front lens means, a collective singlet following said front lens means, a dispersive doublet following said collective singlet, and a group of three air-spaced positive singlets following said doublet; said second component consisting of a negative singlet and a negative triplet; said third component consisting of a dispersive lens member; said fourth component consisting of two air-spaced collective singlets; the absolute values of the individual focal lengths of said first and third components substantially exceeding those of said fourth and second components, respectively; said basic objective consisting of a dispersive doublet composed of a negative first lens and a positive second lens, a positive third lens, a positive fourth lens, a negative fifth lens and a positive sixth lens the numerical values of the radii $r_{27''}$ to $r_{37''}$ of said first lens $L_{16''}$, said second lens $L_{17''}$, said third lens $L_{18''}$, said fourth lens $L_{19''}$, said fifth lens $L_{20''}$ and said sixth lens $L_{21''}$, and of the axial thicknesses and separations $d_{27''}$ to $d_{36''}$ thereof, based upon a numerical value of 1 for a minimum overall focal length of the system, the refractive indices $n_d$ of said lenses and their Abbé numbers $v$ being substantially as given in the following table:

| Lenses | Radii | Thicknesses and separations | $n_d$ | $v$ |
|---|---|---|---|---|
| $L_{16''}$ | $r_{27''}=-2.5$ | $d_{27''}=0.15$ | 1.62 | 60 |
| $L_{17''}$ | $r_{28''}=+5.4$ | $d_{28''}=0.37$ | 1.72 | 30 |
| | $r_{29''}=-11.4$ | $d_{29''}=0.12$ | Air space | |
| $L_{18''}$ | $r_{30''}=+9.0$ | $d_{30''}=0.34$ | 1.55 | 64 |
| | $r_{31''}=-6.3$ | $d_{31''}=0.02$ | Air space | |
| $L_{19''}$ | $r_{32}=+5.9$ | $d_{32''}=0.68$ | 1.52 | 64 |
| | $r_{33''}=-6.8$ | $d_{33''}=0.66$ | Air space | |
| $L_{20''}$ | $r_{34''}=-6.9$ | $d_{34''}=0.15$ | 1.79 | 26 |
| | $r_{35''}=+3.5$ | $d_{35''}=0.18$ | Air space | |
| $L_{21''}$ | $r_{36''}=+16.2$ | $d_{36''}=0.52$ | 1.52 | 64 |
| | $r_{37''}=-4.0$ | | | |

8. A varifocal objective system comprising a basic multilens objective and a varifocal front attachment for said objective, said attachment consisting of a substantially fixed positive first component, an axially movable negative second component, an axially movable negative third component and a fixed positive fourth component; said first component consisting of a dispersive first lens $L_1$, a collective second lens $L_2$, a dispersive doublet composed of a positive third lens $L_3$ and a negative fourth lens $L_4$, a positive fifth lens $L_5$, a positive sixth lens $L_6$ and a positive seventh lens $L_7$; said second component consisting of a negative eighth lens $L_8$ and a negative triplet composed of a positive ninth lens $L_9$, a biconcave tenth lens $L_{10}$ and a positive eleventh lens $L_{11}$; said third component consisting of a dispersive doublet composed of a biconcave twelfth lens $L_{12}$ and a positive thirteenth lens $L_{13}$; said fourth component consisting of a collective fourteen lens $L_{14}$ and a collective fifteenth lens $L_{15}$, the numerical values of the radii $r_1$ to $r_{26}$ of said lenses $L_1$ to $L_{15}$ and of the axial thicknesses and separations $d_1$ to $d_{25}$ thereof, based upon a numerical value of 1 for a minimum overall focal length of the system, the refractive indices $n_d$ of said lenses and their Abbé numbers $\nu$ being substantially as given in the following table:

| Lenses | Radii | Thicknesses and separations | $n_d$ | M |
|---|---|---|---|---|
| $L_1$ | $r_1 = -55.6$ | $d_1 = 0.38$ | 1.62 | 60 |
|  | $r_2 = +7.0$ | $d_2 = 0.27$ | Air space |  |
| $L_2$ | $r_3 = +7.1$ | $d_3 = 0.76$ | 1.62 | 36 |
|  | $r_4 = +17.7$ | $d_4 = 0.43$ | Air space |  |
| $L_3$ | $r_5 = +431.5$ | $d_5 = 1.24$ | 1.62 | 60 |
| $L_4$ | $r_6 = -7.0$ | $d_6 = 0.39$ | 1.73 | 29 |
|  | $r_7 = +11.6$ | $d_7 = 1.14$ | Air space |  |
| $L_5$ | $r_8 = +60.4$ | $d_8 = 0.81$ | 1.64 | 60 |
|  | $r_9 = -13.3$ | $d_9 = 0.01$ | Air space |  |
| $L_6$ | $r_{10} = +12.9$ | $d_{10} = 0.97$ | 1.64 | 60 |
|  | $r_{11} = -23.1$ | $d_{11} = 0.01$ | Air space |  |
| $L_7$ | $r_{12} = +9.0$ | $d_{12} = 0.81$ | 1.64 | 60 |
|  | $r_{13} = \infty$ | $d_{13} = 0.05$ | Air space [1] |  |
| $L_8$ | $r_{14} = +7.0$ | $d_{14} = 0.20$ | 1.69 | 55 |
|  | $r_{15} = +2.3$ | $d_{15} = 0.64$ | Air space |  |
| $L_9$ | $r_{16} = -5.9$ | $d_{16} = 0.30$ | 1.81 | 25 |
| $L_{10}$ | $r_{17} = -3.2$ | $d_{17} = 0.20$ | 1.71 | 54 |
| $L_{11}$ | $r_{18} = +3.2$ | $d_{18} = 0.38$ | 1.81 | 25 |
|  | $r_{19} = +8.6$ | $d_{19} = 5.18$ | Air space [1] |  |
| $L_{12}$ | $r_{20} = -2.5$ | $d_{20} = 0.16$ | 1.71 | 54 |
| $L_{13}$ | $r_{21} = +2.7$ | $d_{21} = 0.42$ | 1.72 | 29 |
|  | $r_{22} = -19.8$ | $d_{22} = 1.00$ | Air space [1] |  |
| $L_{14}$ | $r_{23} = -33.8$ | $d_{23} = 0.34$ | 1.62 | 60 |
|  | $r_{24} = -3.7$ | $d_{24} = 0.01$ | Air space |  |
| $L_{15}$ | $r_{25} = +6.8$ | $d_{25} = 0.29$ | 1.62 | 60 |
|  | $r_{26} = +33.8$ |  |  |  |

[1] Variable.

9. A varifocal objective system comprising a basic multilens objective and a varifocal front attachment for said objective, said attachment consisting of a substantially fixed positive first component, an axially movable negative second component, an axially movable negative third component and a fixed positive fourth component; said first component consisting of a dispersive first lens $L_{1''}$, a collective second lens $L_{2''}$, a dispersive doublet composed of a positive third lens $L_{3''}$ and a negative fourth lens $L_{4''}$, a positive fifth lens $L_{5''}$, a positive sixth lens $L_{6''}$ and a positive seventh lens $L_{7''}$; said second component consisting of a negative eighth lens $L_{8''}$ and a negative triplet composed of a positive ninth lens $L_{9''}$, a biconcave tenth lens $L_{10''}$ and a positive eleventh lens $L_{11''}$; said third component consisting of a dispersive doublet composed of a biconcave twelfth lens $L_{12''}$ and a positive thirteenth lens $L_{13''}$; said fourth component consisting of a collective fourteenth lens $L_{14''}$ and a collective fifteenth lens $L_{15''}$; the numerical values of the radii $r_{1''}$ to $r_{26''}$ of said lenses $L_{1''}$ to $L_{15''}$ and of the axial thicknesses and separations $d_{1''}$ to $d_{25''}$ thereof, based upon a numerical value of 1 for a minimum overall focal length of the system, the refractive indices $n_d$ of said lenses and their Abbé numbers $\nu$ being substantially as given in the following table:

| Lenses | Radii | Thicknesses and separations | $n_d$ | t |
|---|---|---|---|---|
| $L_{1''}$ | $r_{1''} = -55.3$ | $d_{1''} = 0.38$ | 1.62 | 60 |
|  | $r_{2''} = +7.0$ | $d_{2''} = 0.27$ | Air space |  |
| $L_{2''}$ | $r_{3''} = +7.0$ | $d_{3''} = 0.75$ | 1.62 | 36 |
|  | $r_{4''} = +17.6$ | $d_{4''} = 0.43$ | Air space |  |
| $L_{3''}$ | $r_{5''} = +429.3$ | $d_{5''} = 1.24$ | 1.62 | 60 |
| $L_{4''}$ | $r_{6''} = -7.0$ | $d_{6''} = 0.39$ | 1.73 | 29 |
|  | $r_{7''} = +11.5$ | $d_{7''} = 1.13$ | Air space |  |
| $L_{5''}$ | $r_{8''} = +60.1$ | $d_{8''} = 0.81$ | 1.64 | 60 |
|  | $r_{9''} = -13.2$ | $d_{9''} = 0.01$ | Air space |  |
| $L_{6''}$ | $r_{10''} = +12.8$ | $d_{10''} = 0.97$ | 1.64 | 60 |
|  | $r_{11''} = -23.0$ | $d_{11''} = 0.01$ | Air space |  |
| $L_{7''}$ | $r_{12''} = +8.9$ | $d_{12''} = 0.81$ | 1.64 | 60 |
|  | $r_{13''} = \infty$ | $d_{13''} = 0.04$ | Air space [1] |  |
| $L_{8''}$ | $r_{14''} = +7.0$ | $d_{14''} = 0.19$ | 1.69 | 55 |
|  | $r_{15''} = +2.3$ | $d_{15''} = 0.64$ | Air space |  |
| $L_{9''}$ | $r_{16''} = -5.8$ | $d_{16''} = 0.30$ | 1.81 | 25 |
| $L_{10''}$ | $r_{17''} = -3.2$ | $d_{17''} = 0.19$ | 1.71 | 54 |
| $L_{11''}$ | $r_{18''} = +3.2$ | $d_{18''} = 0.38$ | 1.81 | 25 |
|  | $r_{19''} = +8.5$ | $d_{19''} = 5.16$ | Air space [1] |  |
| $L_{12''}$ | $r_{20''} = -2.5$ | $d_{20''} = 0.16$ | 1.71 | 54 |
| $L_{13''}$ | $r_{21''} = +2.7$ | $d_{21''} = 0.42$ | 1.72 | 29 |
|  | $r_{22''} = -19.7$ | $d_{22''} = 0.99$ | Air space [1] |  |
| $L_{14''}$ | $r_{23''} = -33.6$ | $d_{23''} = 0.34$ | 1.62 | 60 |
|  | $r_{24''} = -3.7$ | $d_{24''} = 0.01$ | Air space |  |
| $L_{15''}$ | $r_{25''} = +6.7$ | $d_{25''} = 0.29$ | 1.62 | 60 |
|  | $r_{26''} = +33.6$ |  |  |  |

[1] Variable.

10. A varifocal objective system comprising a basic multilens objective and a varifocal front attachment for said objective, said attachment consisting of a substantially fixed positive first component, an axially movable negative second component, an axially movable negative third component and a fixed positive fourth component; said first component consisting of a dispersive first lens $L_{1'}$, a dispersive second lens $L_{2'}$, a collective third lens $L_{3'}$, a dispersive doublet composed of a positive fourth lens $L_{4'}$ and a negative fifth lens $L_{5'}$, a positive sixth lens $L_{6'}$, a positive seventh lens $L_{7'}$ and a positive eighth lens $L_{8'}$; said second component consisting of a negative ninth lens $L_{9'}$ and a negative triplet composed of a positive tenth lens $L_{10'}$, a biconcave eleventh lens $L_{11'}$ and a positive twelfth lens $L_{12'}$; said third component consisting of a dispersive doublet composed of a biconcave thirteenth lens $L_{13'}$ and a positive fourteenth lens $L_{14'}$; said fourth component consisting of a collective fifteenth lens $L_{15'}$ and a collective sixteenth lens $L_{16'}$; the numerical values of the radii $r_{1'}$ to $r_{28'}$ of said lenses $L_{1'}$ to $L_{16'}$ and of the axial thicknesses and separations $d_{1'}$ to $d_{27'}$ thereof, based upon a numerical value of 1 for a minimum overall focal length of the system, the refractive indices $n_d$ of said lenses and their Abbé numbers $\nu$ being substantially as given in the following table:

| Lenses | Radii | Thicknesses and separations | $n_d$ | $\nu$ |
|---|---|---|---|---|
| $L_{1'}$ | $r_{1'}=+613.0$ | | | |
| | $r_{2'}=+8.8$ | $d_{1'}=0.29$ | 1.62 | 60 |
| | $r_{3'}=-11.5$ | $d_{2'}=1.30$ | Air space | |
| $L_{2'}$ | $r_{4'}=+19.8$ | $d_{3'}=0.29$ | 1.62 | 60 |
| | $r_{5'}=+14.5$ | $d_{4'}=0.05$ | Air space | |
| $L_{3'}$ | $r_{6'}=-32.3$ | $d_{5'}=0.69$ | 1.66 | 33 |
| | $r_{7'}=+134.6$ | $d_{6'}=0.27$ | Air space | |
| $L_{4'}$ | $r_{8'}=-5.6$ | $d_{7'}=1.16$ | 1.71 | 54 |
| $L_{5'}$ | $r_{9'}=+26.8$ | $d_{8'}=0.27$ | 1.73 | 29 |
| | $r_{10'}=+81.6$ | $d_{9'}=0.20$ | Air space | |
| $L_{6'}$ | $r_{11'}=-9.1$ | $d_{10'}=0.78$ | 1.64 | 60 |
| | $r_{12'}=+11.9$ | $d_{11'}=0.01$ | Air space | |
| $L_{7'}$ | $r_{13'}=-431.4$ | $d_{12'}=0.58$ | 1.64 | 60 |
| | $r_{14'}=+6.3$ | $d_{13'}=0.01$ | Air space | |
| $L_{8'}$ | $r_{15'}=+15.8$ | $d_{14'}=0.65$ | 1.64 | 60 |
| | $r_{16'}=+7.0$ | $d_{15'}=0.03$ | Air space [1] | |
| $L_{9'}$ | $r_{17'}=+2.5$ | $d_{16'}=0.20$ | 1.69 | 55 |
| | $r_{18'}=-5.1$ | $d_{17'}=0.69$ | Air space | |
| $L_{10'}$ | $r_{19'}=-3.1$ | $d_{18'}=0.27$ | 1.81 | 25 |
| $L_{11'}$ | $r_{20'}=+3.1$ | $d_{19'}=0.20$ | 1.71 | 54 |
| $L_{12'}$ | $r_{21'}=+8.6$ | $d_{20'}=0.35$ | 1.81 | 25 |
| | $r_{22'}=-2.4$ | $d_{21'}=5.21$ | Air space [1] | |
| $L_{13'}$ | $r_{23'}=+3.3$ | $d_{22'}=0.16$ | 1.71 | 54 |
| $L_{14'}$ | $r_{24'}=-15.2$ | $d_{23'}=0.42$ | 1.72 | 29 |
| | $r_{25'}=-33.8$ | $d_{24'}=0.92$ | Air space [1] | |
| $L_{15'}$ | $r_{26'}=-3.7$ | $d_{25'}=0.34$ | 1.51 | 64 |
| | $r_{27'}=+6.7$ | $d_{26'}=0.01$ | Air space | |
| $L_{16'}$ | $r_{28'}=-19.4$ | $d_{27'}=0.29$ | 1.51 | 64 |

[1] Variable.

11. A varifocal objective system comprising a basic multilens objective and a varifocal front attachment for said objective, said attachment consisting of a substantially fixed positive first component, an axially movable negative second component, an axially movable negative third component and a fixed positive fourth component; said first component consisting of a dispersive first lens $L_{1'}$, a dispersive second lens $L_{2'}$, a collective third lens $L_{3'}$, a dispersive doublet composed of a positive fourth lens $L_{4'}$ and a negative fifth lens $L_{5'}$, a positive sixth lens $L_{6'}$, a positive seventh lens $L_{7'}$ and a positive eighth lens $L_{8'}$; said second component consisting of a negative ninth lens $L_{9'}$ and a negative triplet composed of a positive tenth lens $L_{10'}$, a biconcave eleventh lens $L_{11'}$ and a positive twelfth lens $L_{12'}$; said third component consisting of a dispersive doublet composed of a biconcave thirteenth lens $L_{13'}$ and a positive fourteenth lens $L_{14'}$; said fourth component consisting of a collective fifteenth lens $L_{15'}$ and a collective sixteenth lens $L_{16'}$; the numerical values of the radii $r_{1'}$ to $r_{28'}$ of said lenses $L_{1'}$ to $L_{16'}$ and of the axial thicknesses and separations $d_{1'}$ to $d_{27'}$ thereof, based upon a numerical value of 1 for a minimum overall focal length of the system, the refractive indices $n_d$ of said lenses and their Abbé numbers $\nu$ being substantially as given in the following table:

| Lenses | Radii | Thicknesses and separations | $n_d$ | $\nu$ |
|---|---|---|---|---|
| $L_{1'}$ | $r_{1'}=+291.3$ | | | |
| | $r_{2'}=+8.7$ | $d_{1'}=0.29$ | 1.62 | 60 |
| | $r_{3'}=-11.7$ | $d_{2'}=1.29$ | Air space | |
| $L_{2'}$ | $r_{4'}=+20.0$ | $d_{3'}=0.29$ | 1.62 | 60 |
| | $r_{5'}=+14.7$ | $d_{4'}=0.05$ | Air space | |
| $L_{3'}$ | $r_{6'}=-32.0$ | $d_{5'}=0.72$ | 1.66 | 33 |
| | $r_{7'}=-88.2$ | $d_{6'}=0.22$ | Air space | |
| $L_{4'}$ | $r_{8'}=-5.6$ | $d_{7'}=1.36$ | 1.71 | 54 |
| $L_{5'}$ | $r_{9'}=+28.7$ | $d_{8'}=0.22$ | 1.73 | 29 |
| | $r_{10'}=+70.1$ | $d_{9'}=0.19$ | Air space | |
| $L_{6'}$ | $r_{11'}=-9.3$ | $d_{10'}=0.87$ | 1.64 | 60 |
| | $r_{12'}=+12.4$ | $d_{11'}=0.01$ | Air space | |
| $L_{7'}$ | $r_{13'}=-166.8$ | $d_{12'}=0.66$ | 1.64 | 60 |
| | $r_{14'}=+6.0$ | $d_{13'}=0.01$ | Air space | |
| $L_{8'}$ | $r_{15'}=+15.7$ | $d_{14'}=0.68$ | 1.64 | 60 |
| | $r_{16'}=+5.3$ | $d_{15'}=0.08$ | Air space [1] | |
| $L_{9'}$ | $r_{17'}=+2.2$ | $d_{16'}=0.19$ | 1.69 | 55 |
| | $r_{18'}=-5.0$ | $d_{17'}=0.78$ | Air space | |
| $L_{10'}$ | $r_{19'}=-3.4$ | $d_{18'}=0.30$ | 1.81 | 25 |
| $L_{11'}$ | $r_{20'}=+3.4$ | $d_{19'}=0.19$ | 1.71 | 54 |
| $L_{12'}$ | $r_{21'}=+11.8$ | $d_{20'}=0.38$ | 1.81 | 25 |
| | $r_{22'}=-2.8$ | $d_{21'}=4.83$ | Air space [1] | |
| $L_{13'}$ | $r_{23'}=+3.6$ | $d_{22'}=0.19$ | 1.71 | 54 |
| $L_{14'}$ | $r_{24'}=-7.1$ | $d_{23'}=0.39$ | 1.69 | 31 |
| | $r_{25'}=+14.6$ | $d_{24'}=1.65$ | Air space [1] | |
| $L_{15'}$ | $r_{26'}=-5.8$ | $d_{25'}=0.34$ | 1.53 | 51 |
| | $r_{27'}=+4.4$ | $d_{26'}=0.01$ | Air space | |
| $L_{16'}$ | $r_{28'}=+18.7$ | $d_{27'}=0.29$ | 1.52 | 60 |

[1] Variable.

12. A varifocal objective system comprising a basic multilens objective and a varifocal front attachment for said objective, said attachment consisting of a substantially fixed positive first component, an axially movable negative second component, an axially movable negative third component and a fixed positive fourth component; said first component consisting of a dispersive first lens $L_{1'}$, a dispersive second lens $L_{2'}$, a collective third lens $L_{3'}$, a dispersive doublet composed of a positive fourth lens $L_{4'}$ and a negative fifth lens $L_{5'}$, a positive sixth lens $L_{6'}$, a positive seventh lens $L_{7'}$ and a positive eighth lens $L_{8'}$; said second component consisting of a negative ninth lens $L_{9'}$ and a negative triplet composed of a positive tenth lens $L_{10'}$, a biconcave eleventh lens $L_{11'}$ and a positive twelfth lens $L_{12'}$; said third component consisting of a dispersive doublet composed of a biconcave thirteenth lens $L_{13'}$ and a positive fourteenth lens $L_{14'}$; said fourth component consisting of a collective fifteenth lens $L_{15'}$ and a collective sixteenth lens $L_{16'}$; the numerical values of the radii $r_{1'}$ to $r_{28'}$ of said lenses $L_{1'}$ to $L_{16'}$ and of the axial thicknesses and separations $d_{1'}$ to $d_{27'}$ thereof, based upon a numerical value of 1 for a minimum overall focal length of the system, the refractive indices $n_d$ of said lenses and their Abbé numbers $\nu$ being substantially as given in the following table:

| Lenses | Radii | Thicknesses and separations | $n_d$ | $\nu$ |
|---|---|---|---|---|
| $L_{1'}$ | $r_{1'}=+288.5$ | $d_{1'}=0.29$ | 1.62 | 60 |
|  | $r_{2'}=+8.6$ | $d_{2'}=1.28$ | Air space | |
| $L_{2'}$ | $r_{3'}=-11.6$ | $d_{3'}=0.29$ | 1.62 | 60 |
|  | $r_{4'}=+19.8$ | $d_{4'}=0.05$ | Air space | |
| $L_{3'}$ | $r_{5'}=+14.5$ | $d_{5'}=0.72$ | 1.66 | 32 |
|  | $r_{6'}=-31.7$ | $d_{6'}=0.22$ | Air space | |
| $L_{4'}$ | $r_{7'}=\infty$ | $d_{7'}=1.35$ | 1.71 | 54 |
| $L_{5'}$ | $r_{8'}=-5.6$ | $s_{8'}=0.22$ | 1.73 | 29 |
|  | $r_{9'}=+28.4$ | $d_{9'}=0.19$ | Air space | |
| $L_{6'}$ | $r_{10'}=+69.4$ | $d_{10'}=0.87$ | 1.64 | 60 |
|  | $r_{11'}=-9.2$ | $d_{11'}=0.01$ | Air space | |
| $L_{7'}$ | $r_{12'}=+12.3$ | $d_{12'}=0.65$ | 1.64 | 60 |
|  | $r_{13'}=-165.2$ | $d_{13'}=0.01$ | Air space | |
| $L_{8'}$ | $r_{14'}=+6.3$ | $d_{14'}=0.67$ | 1.64 | 60 |
|  | $r_{15'}=+15.6$ | $d_{15'}=0.10$ | Air space [1] | |
| $L_{9'}$ | $r_{16'}=+6.9$ | $d_{16'}=0.19$ | 1.69 | 55 |
|  | $r_{17'}=+2.4$ | $d_{17'}=0.68$ | Air space | |
| $L_{10'}$ | $r_{18'}=-5.1$ | $d_{18'}=0.27$ | 1.81 | 25 |
| $L_{11'}$ | $r_{19'}=-3.1$ | $d_{19'}=0.19$ | 1.71 | 54 |
| $L_{12'}$ | $r_{20'}=+3.1$ | $d_{20'}=0.35$ | 1.81 | 25 |
|  | $r_{21'}=+8.5$ | $d_{21'}=5.12$ | Air space [1] | |
| $L_{13'}$ | $r_{22'}=-2.4$ | $d_{22'}=0.16$ | 1.71 | 54 |
| $L_{14'}$ | $r_{23'}=+3.4$ | $d_{23'}=0.41$ | 1.72 | 29 |
|  | $r_{24'}=-14.3$ | $d_{24'}=0.94$ | Air space [1] | |
| $L_{15'}$ | $r_{25'}=-33.9$ | $d_{25'}=0.34$ | 1.51 | 64 |
|  | $r_{26'}=-3.7$ | $d_{26'}=0.01$ | Air space | |
| $L_{16'}$ | $r_{27'}=+6.2$ | $d_{27'}=0.29$ | 1.51 | 64 |
|  | $r_{28'}=-24.9$ |  |  |  |

[1] Variable.

13. A varifocal objective system comprising a basic multilens objective and a varifocal front attachment for said objective, said attachment consisting of a substantially fixed positive first component, an axially movable negative second component, an axially movable negative third component and a fixed positive fourth component; said first component consisting of a dispersive first lens $L_{1'''}$, a dispersive second lens $L_{2'''}$, a collective third lens $L_{3'''}$, a dispersive doublet composed of a positive fourth lens $L_{4'''}$ and a negative fifth lens $L_{5'''}$, a positive sixth lens $L_{6'''}$, a positive seventh lens $L_{7'''}$ and a positive eighth lens $L_{8'''}$; said second component consisting of a negative ninth lens $L_{9'''}$ and a negative triplet composed of a positive tenth lens $L_{10'''}$, a biconcave eleventh lens $L_{11'''}$ and a positive twelfth lens $L_{12'''}$; said third component consisting of a dispersive doublet composed of a biconcave thirteenth lens $L_{13'''}$ and a positive fourteenth lens $L_{14'''}$; said fourth component consisting of a collective fifteenth lens $L_{15'''}$ and a collective sixteenth lens $L_{16'''}$; the numerical values of the radii $r_{1'''}$ to $r_{28'''}$ of said lenses $L_{1'''}$ to $L_{16'''}$ and of the axial thicknesses and separations $d_{1'''}$ to $d_{27'''}$ thereof, based upon a numerical value of 1 for a minimum overall focal length of the system, the refractive indices $n_d$ of said lenses and their Abbé numbers $\nu$ being substantially as given in the following table:

| Lenses | Radii | Thicknesses and separations | $n_d$ | $\nu$ |
|---|---|---|---|---|
| $L_{1'''}$ | $r_{1'''}=+554.9$ | $d_{1'''}=0.26$ | 1.62 | 60 |
|  | $r_{2'''}=+7.9$ | $d_{2'''}=1.17$ | Air space | |
| $L_{2'''}$ | $r_{3'''}=-10.4$ | $d_{3'''}=0.26$ | 1.62 | 60 |
|  | $r_{4'''}=+17.9$ | $d_{4'''}=0.04$ | Air space | |
| $L_{3'''}$ | $r_{5'''}=+13.2$ | $d_{5'''}=0.62$ | 1.66 | 33 |
|  | $r_{6'''}=-29.2$ | $d_{6'''}=0.25$ | Air space | |
| $L_{4'''}$ | $r_{7'''}=+167.1$ | $d_{7'''}=1.05$ | 1.71 | 54 |
| $L_{5'''}$ | $r_{8'''}=-5.1$ | $d_{8'''}=0.25$ | 1.73 | 29 |
|  | $r_{9'''}=+24.3$ | $d_{9'''}=0.18$ | Air space | |
| $L_{6'''}$ | $r_{10'''}=+73.9$ | $d_{10'''}=0.71$ | 1.64 | 60 |
|  | $r_{11'''}=-8.2$ | $d_{11'''}=0.01$ | Air space | |
| $L_{7'''}$ | $r_{12'''}=+10.7$ | $d_{12'''}=0.53$ | 1.64 | 60 |
|  | $r_{13'''}=-390.5$ | $d_{13'''}=0.01$ | Air space | |
| $L_{8'''}$ | $r_{14'''}=+5.7$ | $d_{14'''}=0.59$ | 1.64 | 60 |
|  | $r_{15'''}=+14.3$ | $d_{15'''}=0.03$ | Air space [1] | |
| $L_{9'''}$ | $r_{16'''}=+6.3$ | $d_{16'''}=0.18$ | 1.69 | 55 |
|  | $r_{17'''}=+2.2$ | $d_{17'''}=0.62$ | Air space | |
| $L_{10'''}$ | $r_{18'''}=-4.6$ | $d_{18'''}=0.25$ | 1.81 | 25 |
| $L_{11'''}$ | $r_{19'''}=-2.8$ | $d_{19'''}=0.18$ | 1.71 | 54 |
| $L_{12'''}$ | $r_{20'''}=+2.8$ | $d_{20'''}=0.32$ | 1.81 | 25 |
|  | $r_{21'''}=+7.7$ | $d_{21'''}=0.47$ | Air space [1] | |
| $L_{13'''}$ | $r_{22'''}=-2.2$ | $d_{22'''}=0.15$ | 1.71 | 54 |
| $L_{14'''}$ | $r_{23'''}=+3.0$ | $d_{23'''}=0.38$ | 1.72 | 29 |
|  | $r_{24'''}=-13.8$ | $d_{24'''}=0.83$ | Air space [1] | |
| $L_{15'''}$ | $r_{25'''}=-30.6$ | $d_{25'''}=0.31$ | 1.51 | 64 |
|  | $r_{26'''}=-3.4$ | $d_{26'''}=0.01$ | Air space | |
| $L_{16'''}$ | $r_{27'''}=+6.5$ | $d_{27'''}=0.26$ | 1.51 | 64 |
|  | $r_{28'''}=-15.1$ |  |  |  |

[1] Variable.

References Cited
FOREIGN PATENTS

| 82,637 | 2/1964 | France | 350—184 |
| 1,030,462 | 5/1966 | Great Britain | 350—184 |
| 1,108,935 | 6/1961 | Germany | 350—184 |

DAVID SCHONBERG, Primary Examiner

PAUL A. SACHER, Assistant Examiner